US011455400B2

(12) United States Patent
Fox et al.

(10) Patent No.: US 11,455,400 B2
(45) Date of Patent: Sep. 27, 2022

(54) METHOD, SYSTEM, AND STORAGE MEDIUM FOR SECURITY OF SOFTWARE COMPONENTS

(71) Applicant: Sonatype, Inc., Fulton, MD (US)

(72) Inventors: Brian Fox, Goffstown, NH (US); Bruce Mayhew, Fulton, MD (US); Jason Dillon, Fulton, MD (US); Gazi Mahmud, Berkeley, CA (US)

(73) Assignee: Sonatype, Inc., Fulton, MD (US)

( * ) Notice: Subject to any disclaimer, the term of this patent is extended or adjusted under 35 U.S.C. 154(b) by 45 days.

(21) Appl. No.: 16/548,363

(22) Filed: Aug. 22, 2019

(65) Prior Publication Data

US 2021/0056209 A1 Feb. 25, 2021

(51) Int. Cl.
*G06F 21/54* (2013.01)
*G06F 21/56* (2013.01)
*G06F 21/57* (2013.01)
*G06F 8/71* (2018.01)

(52) U.S. Cl.
CPC .............. *G06F 21/577* (2013.01); *G06F 8/71* (2013.01); *G06F 21/54* (2013.01); *G06F 21/563* (2013.01)

(58) Field of Classification Search
CPC ........ G06F 21/577; G06F 8/71; G06F 21/563; G06F 21/54; G06F 21/562; G06F 21/57
See application file for complete search history.

(56) References Cited

U.S. PATENT DOCUMENTS 9,800,590 B1 * 10/2017 Gates ...................... H04L 67/30
10,055,576 B2    8/2018 Milner et al.
2012/0240096 A1   9/2012 Sass
2013/0067427 A1   3/2013 Fox et al.
2013/0074038 A1 * 3/2013 Fox ........................... G06F 8/70
                                                              717/122

(Continued)

FOREIGN PATENT DOCUMENTS

WO    2017/091360 A1    6/2017

OTHER PUBLICATIONS

"Populating a Release History Database from Version Control and Bug Tracking Systems"—Fischer et al, ICSM, Sep. 2013 https://ieeexplore.ieee.org/document/1235403 (Year: 2013).*

(Continued)

*Primary Examiner* — Randy A Scott
(74) *Attorney, Agent, or Firm* — Posz Law Group, PLC

(57) ABSTRACT

A computer system for security of components includes at least one processor. For a new version of a component, the processor determines, based on a dataset of release events over time, a historical behavioral analysis of (i) a project that is released with prior versions of the component, and/or (ii) historical committer behavior of a committer that committed the new version of the component, and/or (iii) historical behavior of a publisher of the project. The dataset of release events includes event data collected over time regarding open source project, committers, and repository. The processor determines whether the new version of the component presents an unusual risk profile, based on the historical behavioral analysis. The processor facilitates delayed consumption of the new version of the component in response to determining that the new version of the component presents the unusual risk profile.

23 Claims, 11 Drawing Sheets

(56) References Cited

U.S. PATENT DOCUMENTS

| | | | |
|---|---|---|---|
| 2013/0311968 A1* | 11/2013 | Sharma | G06F 11/3692 |
| | | | 717/101 |
| 2014/0013315 A1* | 1/2014 | Genevski | G06F 8/60 |
| | | | 717/170 |
| 2018/0260301 A1 | 9/2018 | Podjarny et al. | |
| 2020/0151041 A1* | 5/2020 | Friedrich | G06F 11/0751 |

OTHER PUBLICATIONS

"How is a Committer Expected to Behave"—Jorge Leitao, Software Engineering Stack Exchange, Jan. 2014 https://softwareengineering.stackexchange.com/questions/221126/how-is-a-committer-expected-to-behave (Year: 2014).*

International Search Report and Written Opinion of the International Searching Authority dated Nov. 17, 2020 for the corresponding international application No. PCT/US 20/46600.

International preliminary report on patentability (Chapter I) dated Feb. 17, 2022 by the International Bureau on behalf of the International Searching Authority under Rule 44 bis. I(a) in PCT International Application No. PCTUS2020/046600.

* cited by examiner

Sonatype®  Releases  Help

Releases
Recent component releases.

| Format | Namespace | Name | Version | Qualifiers | Lag |
|---|---|---|---|---|---|
| maven | com.farao-comp ...ity.farao | farao-ra-optimisarion-efs | 10.0 | ("classifier":"sources") | 00:45:32.30 |
| npm | @alexgue | apisense | 10.2 | ⊘ | 00:00:44.24 |
| npm | @notabug | peer | 0.21.3 | ⊘ | 00:43:13.29 |
| npm | @react-form-fields | material-ui | 1.19.2 | ⊘ | 00:45:25.27 |
| nuget | ⊘ | ConrabOpto.Api.Client | 6.64.0-beta-01 | ⊘ | 00:45:32.30 |
| npm | | mod-site | 5.0.2-beta.9 | ⊘ | 00:00:44.24 |
| npm | | mod-site | 5.07 | ⊘ | 00:43:13.29 |
| nuget | ⊘ | Config.Net.Integration.Storage.Net | 5.07 | | 00:45:25.27 |
| nuget | | Config.Net.Azure.KeyVault | 4.13.5 | ⊘ | 00:45:32.30 |
| nuget | | Config.Net | 4.13.5 | ⊘ | 00:44:44.24 |

Callouts: NOT POPULAR (205), NOT RELEVANT (209), DEPENDENCY UPGRADES, NO CORRESPONDING SOURCE TAG, CRYPTO 203 — Format; 205 — Namespace; 207 — Name; 209 — Version; 211 — Qualifiers; 213 — Lag; Refresh

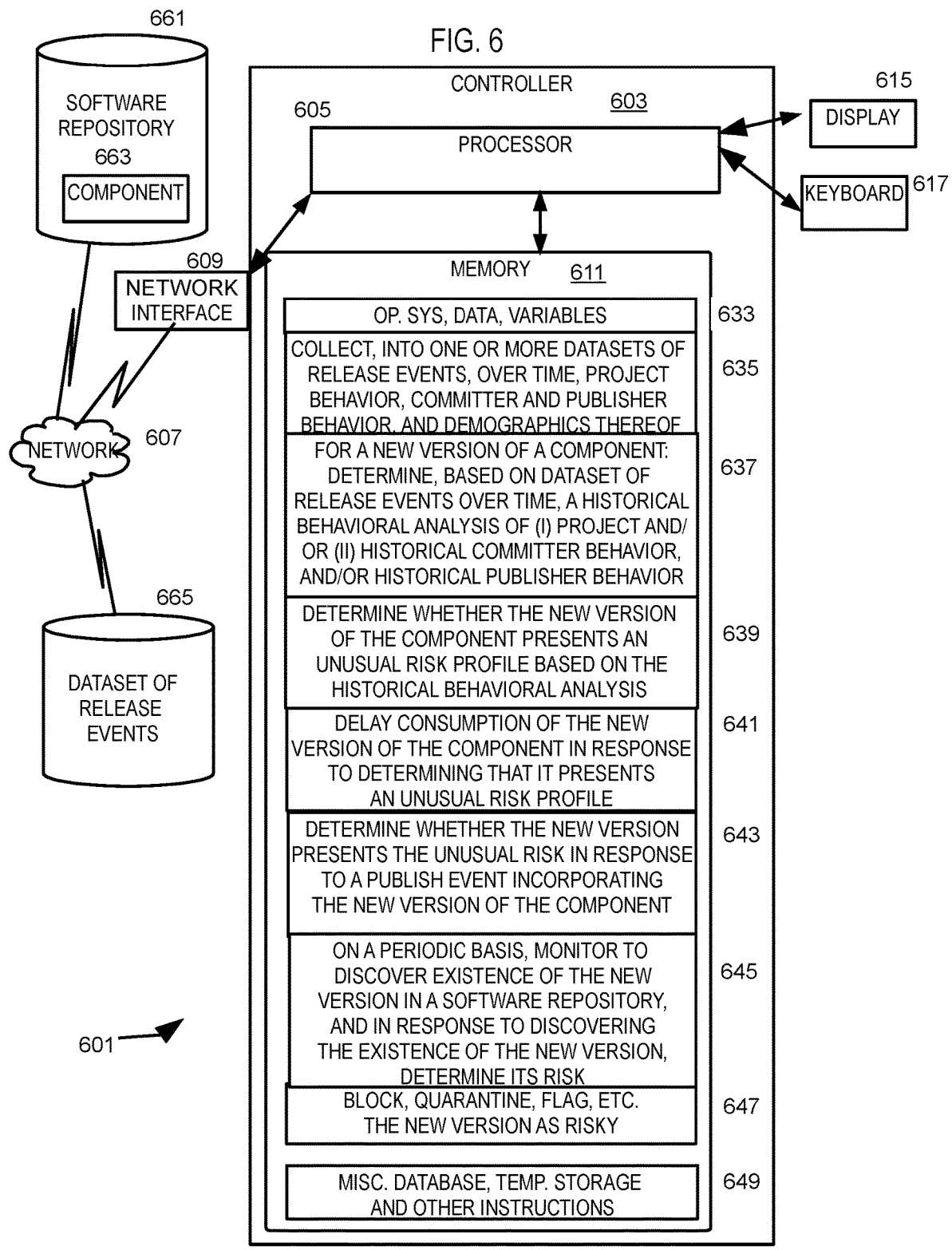

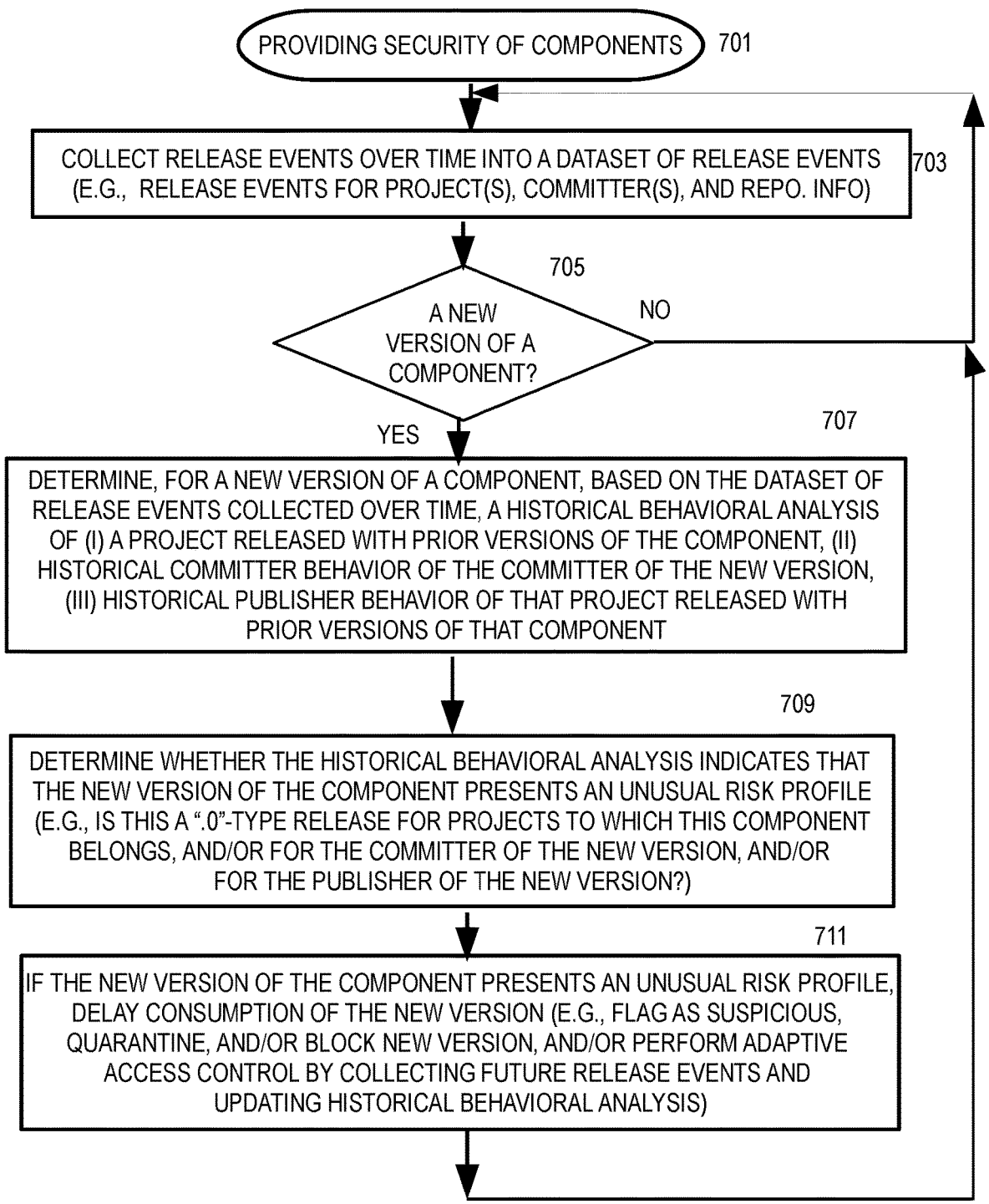

| | Sonatype ® | | Alerts | Help | | |
|---|---|---|---|---|---|---|
| | Alerts Recent alerts. | | | | | 🔄 Refresh |
| | 803 | 805 | 807 | 809 | 811 | 813 |
| | Format | Namespace | Name | Version | Qualifiers | Abnormality |
| 🗃 | npm | @theia | getting-started | 0.8.0-next.8c0d2343 | ⊘ | 66.66667 |
| 🗃 | npm | @theia | editorconfig | 0.9.0-next.fd50a4b1 | ⊘ | 66.66667 |
| 🗃 | npm | @instructure | quiz-pages | 15.5.1-rc.9 | ⊘ | 66.66667 |
| 🗃 | npm | @visual-framework | vf-link-list | 0.0.35 | ⊘ | 66.66667 |
| 🗃 | npm | @theia | typescript | 0.8.0-next.1c89a350 | ⊘ | 66.66667 |
| 🗃 | npm | @nofrills | tasks | 5.20.6-canary.12 | ⊘ | 66.66667 |
| 🗃 | npm | @uswitch | instyle.doughnut-chart | 0.2.3 | ⊘ | 66.66667 |
| 🗃 | npm | @sanity | default-layout | 0.140.38 | ⊘ | 66.66667 |
| 🗃 | npm | @rn-components-kit | deck-swiper | 1.0.0 | ⊘ | 100 |
| 🗃 | npm | @mmccann | tiny | 0.0.1 | ⊘ | 100 |
| 🗃 | npm | @deity | falcon-shop-extension | 0.4.3-nightly.20190625053231.8 | ⊘ | 66.66667 |
| 🗃 | npm | @theia | extension-manager | 0.9.0-next.d2d4f758 | ⊘ | 66.66667 |

🔔 Alert: 3e4d47a87ee4209a58a4d681cd40237e97583ba0 pkg:npm/%40theia/getting-started@0.8.0-next.8c0d234e

Coordinates

| | |
|---|---|
| Format | npm |
| Namespace | @theia |
| Name | getting-started |
| Version | 0.8.0-next.8c0d234e |
| Qualifiers | {} |

Summary

| | |
|---|---|
| abnormality | 66.66667 |

Rules
simple
{
   "triggered": true,
   "minAbnormality": 0,
   "maxAbnormality": 66.66667
}

Signals
npm-registry
{
   "dependenciesChanged": 1,
   "devDependenciesChanged": 1,
   "publisherChanged": 0
}

Facts
npm-registry
{
   "versionFound": true,
   "latestDependencies": [
      "pkg:npm/%40theia/core@0.8.0-next.8c0d234e",
      "pkg:npm/%40theia/filesystem@0.8.0-next.8c0d234e",
      "pkg:npm/%40theia/keymaps@0.8.0-next.8c0d234e",
      "pkg:npm/%40theia/workspace@0.8.0-next.8c0d234e"
   ],
   "latestDevDependencies": [
      "pkg:npm/%40theia/ext-scripts@0.8.0-next.8c0d234e"
   ],
   "latestPublisher": {
      "publisherName": "theia",
      "publisherEmail": "theia@typefox.io"
   },
   "previousVersion": "0.7.2",
   "previousDependencies": [
      "pkg:npm/%40theia/core@%5E0.7.2",
      "pkg:npm/%40theia/filesystem@%5E0.7.2",
      "pkg:npm/%40theia/keymaps@%5E0.7.2",
      "pkg:npm/%40theia/workspace@%5E0.7.2"
   ],
   "previousDevDependencies": [
      "pkg:npm/%40theia/ext-scripts@%5E0.7.2"
   ],
   "previousPublisher": {
      "publisherName": "theia",
      "publisherEmail": "theia@typefox.io"
   }
} release
{
   "repository": "npmjs.org",
   "filename": "getting-started-0.8.0-next.8c0d234e.tgz",
   "size": 12125,
   "sha1": "fcb295f43a809b6ec17d9c58f812b6f0ec0dd468",
   "ingestTimestamp": "2019-07-15T12:46:14.135Z",
   "publishedTimestamp": "2019-06-18T07:43:39.815Z",
   "fetchedTimestamp": "2019-06-18T07:51:45.034Z",
   "manifestUri": "s3://sonatype-labs-boogaloo-dev-ingest-output/2019/06/18/npm/@theia/getting-started/0.8.0-next.8c0d234e/3e4d47a8
   "dpaUri": "s3://sonatype-labs-boogaloo-dev-ingest-output/2019/06/18/npm/@theia/getting-started/0.8.0-next.8c0d234e/3e4d47a87ee4
   "binaryUri": "s3://sonatype-labs-boogaloo-dev-ingest-output/2019/06/18/npm/@theia/getting-started/0.8.0-next.8c0d234e/3e4d47a87e
}

METHOD, SYSTEM, AND STORAGE MEDIUM FOR SECURITY OF SOFTWARE COMPONENTS

TECHNICAL FIELD

The technical field relates in general to computer security, and detecting possibly malicious software components.

BACKGROUND

In today's software development field, software components that are used in connection with an application are usually written by others, and are used and re-used, possibly with changes. This trend is increasing.

A software repository is a known technique to provide developers with a convenient collection of re-used and re-usable software components, whether open source or otherwise, where the package and/or component in the software repository may be a copy or specialized version and/or may incorporate other components and/or packages such as by dependency. A conventional repository manager can be used as a central point of storage and exchange for packages and software component usage. The software repository provides a storage to which a developer can publish a component, and thereafter the component is listed and available for use by others.

The available tools for software development makes it easy to use and re-use software components and packages. A package is conventionally used to organize a set of related components intended for use by a particular application. The package may contain, by way of example, content needed to reference an external library; source code, binaries, executables, classes, and interfaces; identifying information and a manifest that identifies requirements of the package; scripts, other packages, and related items that run when the package is installed, de-installed, and/or used by a software application. A developer of a file or package typically will publish the package with that file to a repository so that the package can be shared and re-used, such as by other developers.

The last two years have seen many instances of attacks perpetrated by criminals publishing intentionally malicious components into popular open source repositories used by tools such as npm and pypi. These malware components sometimes contain cryptocurrency miners, but other attacks have stolen private ssh keys, inserted backdoors, and/or even delivered targeted patches to alter proprietary code.

These maliciously crafted components are sometimes spotted quickly by the community, but in other cases, months pass before the malware has been discovered (if detected at all). Since many tools pick up new versions from the repository as soon as they are available, developers are potentially exploited from the moment new versions are pulled into development environments, the build infrastructure, and eventually production.

Consider that a popular artifact may be downloaded millions of times a week. If malware, for example, a crypto-miner, is injected into the popular artifact, the popular artifact with the malware becomes downloaded instantly to millions.

There is an increase in the trend of bad actors intentionally creating artifacts and injecting them directly into what the industry likes to call the "supply chain" (of downloaded, continuously updated software) by spoofing developer and/ or publisher credentials. The artifact is malicious, and users are exploited as soon as the artifact hits the repository. There are other attack vectors besides simply getting and spoofing credentials. As another example, bad actors may social engineer their way in to deliberately add malicious code. This has implications for the entire software supply chain.

The desirability of avoiding malicious software is well understood, along with configuring a computer to prevent malicious software from being introduced, and configuring a computer to remediate any malicious software which was introduced onto the computer.

There have not been any significant solutions to the problem that malware might be introduced into a repository and spread thereafter, because this is a new problem in this space. Traditional approaches to security here have relied on someone detecting the latent issue, but by the time that happens, someone may have been exploited for a long time.

In particular, with all of the sharing of software components, there is no way to quickly detect a potentially malicious software component, preferably before it pervades the repository and the ecosystem served by the repository.

SUMMARY

Accordingly, one or more embodiments provide a computer system which provides for security of components. The computer system includes at least one processor configured to perform the following.

The processor is configured to, for a new version of a component, determine, based on a dataset of release events over time, a historical behavioral analysis of (i) a project that is released with prior versions of the component, and/or (ii) historical committer behavior of a committer that committed the new version of the component, and/or (iii) historical behavior of a publisher of the project, wherein the dataset of release events includes event data collected over time regarding open source project, committers, and repository. The processor is configured to determine whether the new version of the component presents an unusual risk profile, based on the historical behavioral analysis. The historical behavioral analysis may rely most heavily on the most recent behavior. The processor is configured to facilitate delayed consumption of the new version of the component in response to determining that the new version of the component presents the unusual risk profile.

In one or more embodiments, the processor is further configured to determine a profile of the new version of the component.

In one or more embodiments, wherein the processor is further configured to determine whether the new version presents the unusual risk in response to a publish event incorporating the new version of the component.

In one or more embodiments, the publish event is a commit, or a release.

In one or more embodiments, the processor is further configured to, on a periodic basis, monitor to discover existence of the new version in a software repository, and determine whether the new version that exists presents the unusual risk responsive to discovering the existence of the new version.

In one or more embodiments, the processor is further configured to perform adaptive access control which delays consumption of the new version which is determined to present the unusual risk profile.

In one or more embodiments, the processor is further configured to, in response to determining that the new version of the component presents the unusual risk profile, block, quarantine, or flag use of the new version.

In one or more embodiments, the processor is further configured to determine whether the new version of the component presents the unusual risk based on a classification change of the new version of the component, wherein the classification change includes one or both of a source code differential classification and a dependency change classification.

A further embodiment is a computer-implemented method, according to one or more of the above embodiments.

Still another embodiment is a non-transitory computer-readable medium comprising instructions for execution by a computer, the instructions including a computer-implemented method as above, the instructions for implementing the method in a processor.

One, or a combination of more than one, or all, of the above embodiments, can be combined and provided as a single embodiment.

Further, the purpose of the abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The accompanying figures, where like reference numerals refer to identical or functionally similar elements and which together with the detailed description below are incorporated in and form part of the specification, serve to further illustrate various exemplary embodiments and to explain various principles and advantages in accordance with the embodiments.

FIG. 2 is a diagram illustrating a user interface for providing security of components;

FIG. 6 is a block diagram illustrating portions of a computer;

FIG. 7 is a flow chart illustrating a procedure for providing security of components;

FIG. 8 is a block diagram illustrating an alternative user interface for providing security of components; and FIG. 9 is an example drill down that represents how detection was determined.

DETAILED DESCRIPTION

I. Introduction

Figure 1A:
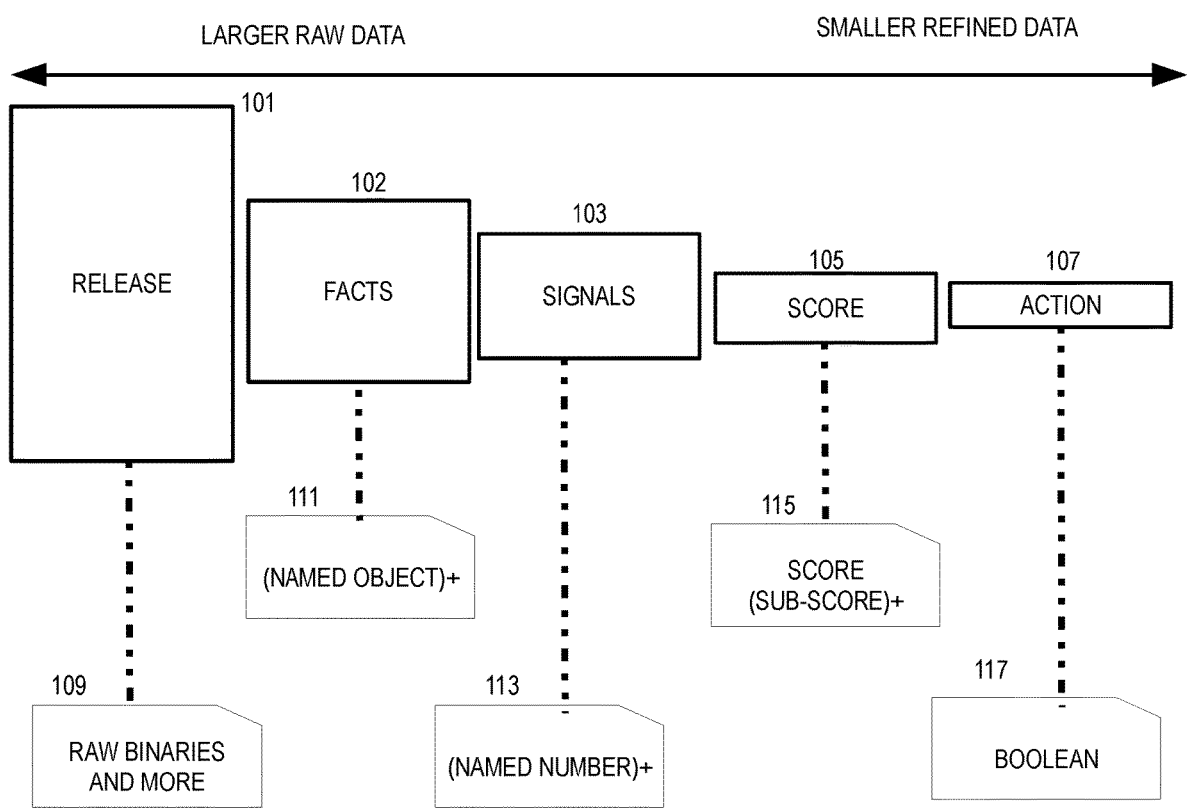
FIG. 1A is a diagram illustrating a data available for collection regarding a software component.

In overview, the present disclosure concerns software development, in which software code building blocks, sometimes referred to as binary or source code, are submitted to be published as formally released for use as one of plural building blocks to be used in a build of a complete piece of software. Such software development can provide project management tools, for example that reduce risk and assist in informed decisions in selecting software components that are used in a project. More particularly, various inventive concepts and principles are embodiments in systems, devices, and methods therein for providing security with regard to software components intended for use in a software development project. One or more embodiments of such systems, devices, and methods can provide security and/or identification of a software component that presents an unusual risk profile, based on historical behavioral analysis which can refer to, for example, multiple lines of analysis relating to that version of the component.

More particularly, various inventive concepts and principles are embodied in systems, devices, and methods therein for security of components that uses behavioral analysis of each component's committers, project release behavior and other attributes, to predict whether a new version of a component presents an unusual risk profile, independent of content of the component itself. The approach herein will allow users of the technology to be informed and to take action including blocking, quarantining, or flagging the use of a suspect version of a component, pending further investigation and remediation.

II. Problem Presentation and Observations

A. Software Repository Vulnerability

A person may intentionally publish one or more malicious components into an open source repository. If not detected and removed first, or if the repository is not protected against a malicious component, such a malicious component can be incorporated into an executable computer program. This is because the process of building an executable computer program is conventionally managed by a build tool, which is a computer program that automatically controls other programs to compile and link the various files, ordinarily the most recent releases thereof, which together comprise the executable computer program, in the correct order. A build tool can include preprocessing, compilation, linking, packaging, testing, and ultimate distribution of the executable computer program. Examples of build tools and project management tools are APACHE MAVEN available from The Apache Software Foundation ("Apache"), APACHE ANT available from Apache, BUILDR available from Apache, GRADLE available from Gradle Inc., APACHE IVY, and the like. Accordingly, the executable computer program may automatically incorporate the malicious component.

B. Problem Statement

Recently, there have been instances of persons publishing intentionally malicious components into popular open source software repositories. These malware components sometimes contain cryptocurrency miners, but other attacks have stolen private ssh keys, inserted backdoors, and even delivered targeted patches to alter proprietary code. Bad actors may be inserting components with intentional vulnerabilities and/or exploitations (e.g., a crypto-miner), such as by stealing legitimate developer credentials.

As time passes it becomes more and more likely that the malware, which may not yet be identified as malicious or problematic, is automatically incorporated into distributed software.

The present inventors believe that the risks presented by questionable components are not limited to intentional malware. The present inventors want to detect that, for example, a particular release of a component has a higher risk of malware or problems than previous releases, so as to prevent customers from downloading this questionable component, at least for some period of time. After detecting the component which is determined to be questionable, the system can protect against entry of the questionable component into the repository, and/or protect against use of the questionable component.

What the inventors intend is to detect that something about a particular release is suspicious, or at least indicates to us that the particular release is a higher risk than the previous releases, so that, for example, developer products and/or a repository firewall could stop customers from downloading this suspicious artifact. The halt on downloading may be at least for some period of time, since it possible that a particular component may appear to be less risky as time passes.

C. Previous Approaches

The malware may be identified, if at all, by the user community, usually after some time has passed and after the malware has achieved widespread distribution.

Currently, users rely on happenstance identification of malware, or on malware which is identified, for example, by a vulnerability scanner and traced back to a particular component.

In current products, components with known vulnerabilities may be flagged. Developers may avoid such components that have been flagged. For example, metadata of a software artifact can include a security risk which can be conventionally obtained such as from third party information after being correlated from a publicized evaluation of released software. The Mitre CVE (Common Vulnerabilities and Exposures) list and NIST NVD (National Vulnerability Database) and other organizations conventionally provide text information about vulnerabilities and security of actually-released commercial software applications. However, the CVE list and NVD database indicate commercial software application names and versions or version ranges which do not readily map to software artifact coordinates, and consequently are applicable to actually-released software.

Other users may have taken a high level approach related to the hygiene of a particular project that speaks to the project as a whole. For example, consider a situation that historically, a particular project has no committers, or that commit infrequently; a sophisticated user may personally be suspicious of a new commit to such a project; such a suspicion may or may not be informally shared with others.

III. Aspects of the Approach

Further in accordance with exemplary embodiments, there is provided a method and/or system that resolves the issues mentioned above.

As further discussed herein below, various inventive principles and combinations thereof are advantageously employed to allow determination, possibly prior to actual use, that a release of a component may be malicious and/or risky.

A. Concept Summary

The present inventive approach is try to predict ahead of time that an action of a new release may be fishy. The determination that a new version of a component may be based on release events over time, which are related to expected release behavior of that component. Aspects of expected release behavior include historical behavior of the project that previously was released with one or more versions of the component; and/or historical behavior of a committer that committed the new version of the component being evaluated; and/or historical behavior of a publisher of the project that previously was released with one or more versions of the component. Such a determination need not be based on the content of a component.

The determination that the component is questionable may happen immediately, such as upon publication or an attempt to place the component into a software repository, so that the questionable component has no opportunity to be downloaded by other developers. In another aspect, a repository may be periodically reviewed to identify whether there is a questionable component. In another aspect, a determination that the new version of the component is questionable may happen upon a build attempting to incorporate the new version of the component, possibly incorporating a determination whether the component should be evaluated as being a new version not previously evaluated.

In yet another aspect the system can leverage the consumption patterns of the supply chain (as exhibited in the historical behavioral analysis) as the attack vector, verses finding an inadvertent flaw in, e.g., the existing software repository. The attack can be a deliberate action and the attack vector is detected due to use of the historical behavioral analysis. The attack could be due to a weakness in the software repository, a weakness in the source repository, and/or social engineering of the source code author.

The general idea of immediately determining that a component is questionable may bring to mind a credit card fraud determination. Credit card fraud detection is an imperfect analogue. In the past, it took a while for a credit card company to determine that a particular card should be black-listed; a stolen credit card was still usable for some time before being placed on a blacklist. The component community is at a point now where it takes some time and experience with a particular component before that component is effectively blacklisted.

Credit card fraud detection no longer relies on blacklisted credit card numbers but instead profiles each user's spending behavior using the credit card so as to detect and decline an anomalous purchase attempt on the spot. Now, credit card companies understand individual consumer behaviors to be able to determine what is anomalous. Credit card companies also utilize heuristics to determine questionable behavior, such as a $1 transaction at a gas station.

The approach discussed herein is intended to not only detect a maliciously crafted component, but also detect a component which may be legitimate but risky due to a real behavior change within the project, the publisher, the committer and/or the developer.

B. Overview of Approach

The general concept is to determine behavior which is not normal, so as to be identified as high risk.

The behavioral analysis is performed to identify a risky release of a component, i.e., a particular release might be malicious, e.g., in relation to other releases of that same project, and/or in relation to the repository ecosystem(s) as a whole.

For example, if a release is published by someone that has not published it before. It could be a release due to purloined credentials, or it could be someone who is a new committer (to that release). Adding a whole new dependency may introduce a risk; someone might add a new dependency to be malicious, or it could be a significant change to the code base (legitimate but risky). While introducing a new component may be risky, "who" introduced it and "what" was introduced as even more important. As to "who", for example, if the Committer has no reputation or history in the source control ecosystem that is a good indication of increased risk.

As to the "what", if an outbound i/o communication is added or a command shell execution is added, that is also a good indication of increased risk.

Some embodiments may include an adversarial network, for example, a generative adversarial neural network, in which the system feeds in the normal and abnormal transactions.

There are many behaviors or demographics that could be indicators of increased risk.

The system intends to understand each committer's behavior, as well as behaviors which tend to indicate suspicious activity as heuristics that apply to everybody. What may be suspicious for one person may be normal for another. Consequently, the approach herein is to understand, for a particular project, what is normal for a particular project. Then, when a release arrives that is not normal, the new release can be flagged as having an inordinate amount of risk, different from previous related releases.

Being flagged as suspicious does not necessarily mean the suspicious release is malicious. Nevertheless, the hypothesis is that the malicious releases will fall into things that are identified as higher risk, i.e., that malicious releases will be suspicious.

It is expected that, after a particular release of a component is identified as high risk, the risk of that release of the component may degrade over time as behavior (which continues to be observed over time) becomes normalized to the new behavior, at least in situations which are not malicious but merely reflect a new normal behavior. Consequently, the level of risk of suspicious, non-malicious releases will probably degrade over time. The degradation of risk of a particular release may be due to the factor of time, for example, if something seemed suspicious when it was newly released, but the community has not found anything to be actually wrong with it over, e.g., weeks, the consumer may for example configure their firewall to effectively degrade the risk over that period of time. As another example, the system may retroactively re-assess the risk, e.g., it could be determined that a particular component initially appears to be suspicious, but, e.g., three months later it is determined to not be risky based on behavior subsequent to the release which is observed to be normal. If that is the situation, then upon re-evaluation the risk of that particular release returns to normal; furthermore, the behavior (originally determined to be suspicious) becomes part of the baseline.

C. ".0" Concept

People tend to avoid ".0" releases of, e.g., operating systems, because users expect bugs and other changes—the risk is higher than releases which are not .0. Many users will wait and not adopt the ".0" operating system release until time has passed and bugs identified by other users have been fixed. A ".0" release of an operating system (as one example) is not necessarily malicious or bad. But there is a heightened level of risk. Conventionally, a ".0" release is a major release of an operating system, wherein the version is denominated "x.0."

The inventors have found that there are other things that happen in the life of a software component that indicate what is an extension of the .0 problem, never previously recognized.

The present disclosure may build on a hypothesis that a ".0" (dot zero) component may be risky, where a ".0" component may be, for example, a first major release relating to a behavior of the component.

For example, a new publisher, who has never before published, increases the risk of the component. As another example, new committers that have never been seen before, as committing code to this release, raise the risk. The ".0" component may be a component with a "first occurrence" of one or more characteristic(s) related directly or indirectly thereto.

There is an important distinction in that this behavioral analysis is for the purpose of identifying a risky release of a component. As an example, previously, others may have done things related to the hygiene of a particular project (understanding that historically, this project has no committers, or that commit infrequently)—that speaks to the project as a whole.

The present system and method is trying to identify, even within a particular project, that a particular release might be suspicious (even though the project as a whole does not seem suspicious) because, e.g., a user's credentials were hacked and used to insert a suspicious component and nobody noticed yet. Stolen credentials would appear as if they were an existing publisher, but the system would recognize suspicious behavior because, for example, that user had never previously published from that geographic location (e.g., China). A feature is to understand that this release of a component in the project is abnormal in comparison to the previous one or more releases of that same project.

One can consider, that a release is published by someone that had never published it before, could be due to stolen credentials, or it could be due to a legitimate new committer. In the case of a new committer, it is still an increased risk because someone new is more likely to do something incorrectly than a user who is experienced on that project.

As another example, adding a new dependency (not just an updated dependency) that was never there before will increase a risk. If somebody steals credentials from a logger, that person might actually add the dependency that was never there before. That might by itself indicate possibly malicious behavior. On the other hand, a new behavior not previously seen for a committer and a project might just indicate that a user made significant changes to the code base which is also increased risk of bugs (not necessarily malicious). Either way, a user such as a developer might want to back off from the new dependency and understand that there is a risk.

In this regard, these are the type of heuristics. An aspect includes a machine learning artificial intelligence approach using an adversarial network. The adversarial network can feed all of the transactions into the system, and the system figures out what is normal and abnormal; the normal vs. abnormal transactions may be used to determine whether each individual release of a component is normal. This adversarial network may be used to determine whether each individual release of a component follows normal behavior.

In short, the system or method determines that an individual release itself has increased risk and may be malicious, that determination regarding behavior of the individual release can be fed to a system to try to stop somebody from using the individual release. These risks to be observed are nearly infinite. However, herein, past behaviors are observed over time, so that the system and method can observe that just now happened with an individual release is weird compared to the relevant past behavior.

IV. Details of Concepts and Variations

The following example and some variations are well suited to demonstrate various implementation details and advantages.

Properly monitoring release integrity may utilize an ensemble model actively responding to software changes, in some embodiments using a layered adaptive access control system. The ensemble model is a combination of a simple rules engine and a more complex behavioral analysis system. The release event dataset may be comprised of open source project, committer data, and repository data. The system can reason about release events in isolation, release events in combinations, and the trending of these release events over time. A significant challenge in understanding release integrity is the availability of large amounts of pertinent data as well as the size of the dataset and the cost of the analytics.

Figure 1B:
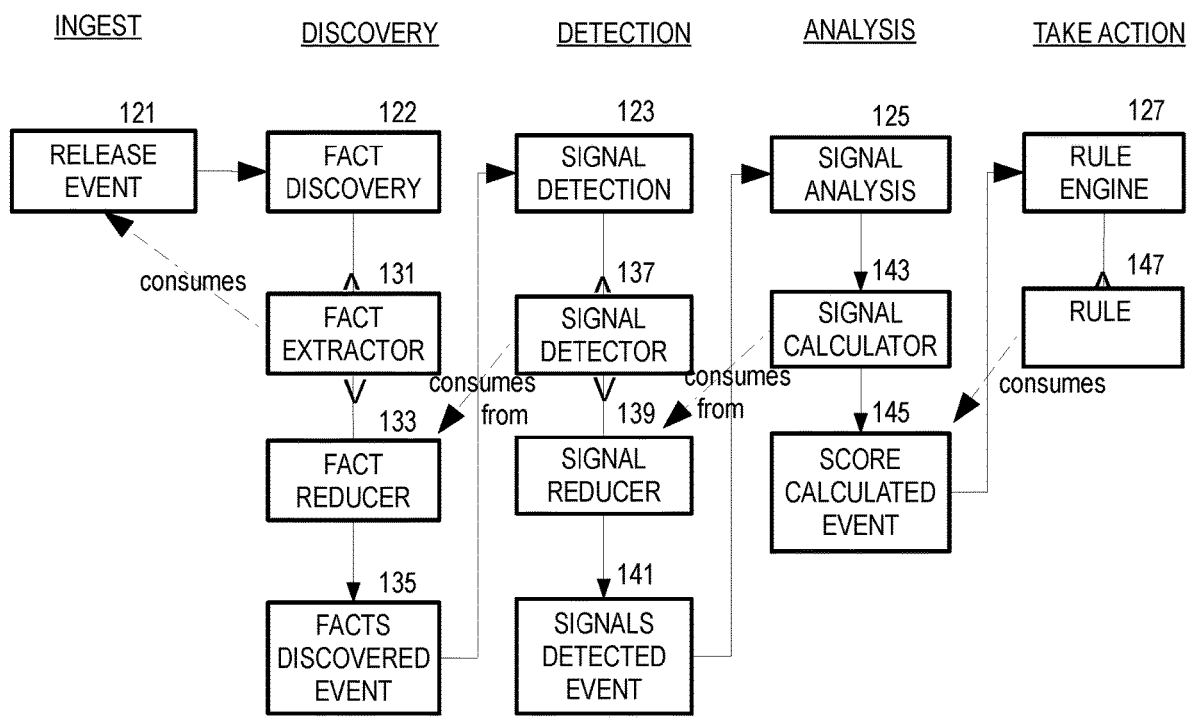
FIG. 1B is a workflow diagram corresponding to FIG. 1A.

FIG. 1A and FIG. 1B respectively illustrate data flow and work flow. FIG. 1A is discussed first, follows by FIG. 1B.

FIG. 1A is a diagram illustrating a data available for collection regarding a software component, and provides an illustration of data flow through release integrity monitoring. The data flow consists of collecting data (on the left of FIG. 1A) and refining the data set (towards the right) via a work flow (from left to right of FIG. 1A). Each stage of the workflow reduces the dataset into more discrete and meaningful data. The stages include release 101, facts, 102, signals 103, score 105 and action 107. The data is collected at the release 101 stage. Various data are conventionally collected during software development, and in particular by producing a release.

A release 101 typically produces raw binaries 109, sources and/or other assets for a release; SCM for a release; issue trackers and websites; documentation, and the like; as is well known in the art. There are well known terminology and well-understood standard steps for committing a change, producing a release, and pushing a component to a software repository. A release is anything that is published beyond the group that owns it. Typically a release is signed, for example, cryptographically by a release manager. During a process of developing software and preparing a release, various components and packages are made available to the developers for testing, and can include raw source, nightly builds, snapshots, release candidates and alike, which are intended only for developers. Once a release is approved, artifacts are uploaded to a project's subdirectory, and typically each release artifact is signed by a committer. Accordingly, a release conventionally produces raw binaries 109 and more, such a metadata file for each component binary including, e.g., information for disaster recovery; an indication of one or more entities (e.g., publisher(s)) responsible for release; an indication of the project who owns the release; components in the release; an indication of committer(s) who contributed to a component in the release; and other available information such as date/timestamp of components, committed changes, geographic location of actions, and the like. This information is conventionally collected by a software development system. Some systems may collect more comprehensive information than others, or some information may not be available for collection. Some information may be indirectly obtained, for example, the history of releases to which a component belong may be obtained by determining the component, and then the releases which have included the component and the project(s) to which the component belongs, and the committers who historically have committed the component. This may be a very large amount of raw data. The point is that this information is available, but has never been leveraged as in the present system.

FIG. 1A also illustrates facts 102 which are collected and stored, which relate to various named objects 111 (named object)+. The refined data can be obtained from a release dataset as structured objects. Multiple fact collectors for a single release may be provided, each producing its own result structured object.

FIG. 1A also illustrates signals 103 which are collected, which are a dataset of named numbers 113 (named number)+, which are refined data derived from "facts".

FIG. 1A also illustrates a score 105 which is developed, such as score function 115 (e.g., score (sub-score)+). Refined data calculated from signals may result in a numeric score and optionally sub-score numbers.

FIG. 1A also illustrates an action 107 which may be taken such as to manage a component in a repository, and which generates a value indicating the action which was taken, here represented as boolean values 117. The action information may include not only the action taken with respect to the repository, project and component (e.g., public release, commit, produce release, retrieve component, push component to repository, and the like) but also an indication whether the action was taken or not taken, or successful or not successful (and hence is similar to a boolean). The amount of information available for an action 107 is relatively refined.

The data to the left of FIG. 1A tends to be very large and in raw form, and decreases to the right of FIG. 1A where the data is more refined and smaller.

The system and method can analyze not only the world of open source but a statistically valid sample of the world of commercial application development. Maintaining a repository of open source binaries provides visibility into development behavior. A data processing platform can deliver incremental insights associated with such behavior. In addition to the extensive data processing platform which can observe behaviors as to how components are released, behavioral analysis can be leveraged to actively alert consumers of open source when selecting potentially bad components from the interne as well as throughout the development lifecycle.

An available data processing platform already evaluates certain aspects of every open source release.

However, the combination of the automation associated with event analysis combined with targeted human evaluation and curation can lead to the optimized data with a highly scalable solution.

A simple rules engine can understand change events to a project's health. For example, was a new dependency added, or is the release complexity too high, or did the geolocation of the publisher change? These are the types of indicators that something significant has happened in the project.

Reference is made to FIG. 1B, a workflow diagram corresponding to FIG. 1A. A High-level workflow consists of several stages: Ingestion of a release event 121, Fact Discovery 122, Signal Detection 123, Signal Analysis 125, and Taking Action (Reaction) such as by a Rule Engine 127.

In an implementation, stages may be loosely coupled together via topics and/or queues as desired.

Steps of workflow stages may persist outputs, for example as S3 objects; in an embodiment, data could be expressed into databases. Both S3 and databases may be implemented, for example first recording data into S3 as the primary means of persistence.

Ingestion

Release monitoring may provide release events 121 as the basis of ingestion for the release event 121 stage, and may rely on the DevOps pipeline release manifest operating processing to provide release events as usual. This is the end of the pipeline release detection workflow and contains refined metadata about the component and other reference data from the pipeline. Release event data obtained at the release event 121 stage may be passed to the fact discovery 122 stage, which extracts data relevant to the releases. Release events 121 are conventionally provided by a repository manager and development tools. Formats of the release events 121 is known and may be revised and adapted from time-to-time by developers in accordance with conventions. The present system is intended to be useable with the events as they are revised and adapted from time-to-time.

Fact Discovery

The fact discovery 122 stage may include a fact extractor 131 process of taking release-event data and extracting data which may be gleaned from a release. This process does not try to do any correlation or calculation, instead this process has a purpose of obtaining and recording information from a release. For example, for an npm release, with package-metadata from the registry the system can determine the userid and email address of the user who published the release. The system can also determine from the package-metadata for the release what the direct dependencies are of the release, and so on. The information obtained by the fact extractor 131 is reduced by a fact reducer 133 process, and in some embodiments the facts are stored in a history for use in a behavioral analysis. The fact discovery 122 stage can issue a facts discovered event 135 when a fact is discovered. The facts discovered event 135 can initiate the signal detection 123 stage.

Signal Detection

In the signal detection 123 stage, signals are detected by a signal detector 137 process based upon facts gathered in the fact discovery 122 stage. Some embodiments may provide additional servicers or databases for additional correlation to provide enriched information. Signals may be implemented as higher-order datasets, for example as a machine learning database for Higher-Order Logic; higher-order datasets are in general known.

Taking the example above for npm fact discovery, if there is a "npm-publisher" fact discovery by the fact discovery 122 stage, a signal reducer 139 process can retrieve the facts of the previous release (for example using known techniques), and then compare the previous and current publishers; if changed the system derives a "npm-publisher-changed" signal (0 unchanged, 1 changed). If the fact is changed, then a signals detected event 141 may be issued. The signals detected event 141 is input to the signal analysis 125 stage, for example as named numbers.

Signal Analysis

In overview, a signal calculator 143 process of the signal analysis 125 stage inputs signals (for example, named numbers), and produces a smaller and normalized set of normalized numbers (a score). Normalizing and scoring techniques are generally known. If a different score (or a sufficiently different score) is produced, than a score calculated event 145 may be generated and input to the rule engine 127 stage. Alternatively, a score calculated event 145 may be generated and input to the rule engine 127 stage whenever calculated.

Take Action

The take action/rule engine 127 stage consumes a score and determines what to do about it. One or more actions may be taken, or no action taken, depending on the rule 147 configuration.

For example if a given score calculated event is understood to indicate abnormality, a rule could take an action to notify of the abnormality, such as to send email, or run logic to inform another system (like JIRA).

Reference is made to FIG. 2, a user interface with sample indicators in isolation. FIG. 2 is a diagram illustrating a user interface 201 for providing security of components. The user interface 201 provides a display of available data which may be used for behavioral analysis of a new version of a component.

The example user interface specifies, for a release of a component, the following if available: the format 203, the namespace 205 of the component, the name 207 of the component, the canonical version 209 of the component, any qualifiers 211, and a time lag 213. These fields are well understood.

The format 203 indicates the repository format where the new version of a component is located. The namespace 205 of the component is a descriptive name prefix which indicates a space owned by a user(s) and can be obtained from POM metadata conventionally stored with an artifact.

Conventionally a component has a name 207 and canonical version 209.

Conventionally, a component may have been associated with one or more qualifiers, which may be a set of annotations 211 and/or may type-specific.

The time lag 213 is conventional, and indicates a length of time between two events. For example, time lag may be the amount of time between being published to a repository and ingestion.

Detection of Release Abnormality

Software changes between releases involve a sequence of diverse change events and a set of identifiable properties of contributing actors or Software Developers and project maintainers who trigger these events. Latent abnormalities that may impact the integrity of the release may be hidden among the overwhelming majority of their benign peers. In an attempt to surface these abnormalities between software releases, feature identification and classification of all events and committer properties is an essential step towards building a predictive model to detect malicious patterns. Below are some examples of release events and actor properties:

—Committer Reputation rank— Consider an event that a new dependency is added. In the system, a simple new dependency added rule may be important as this event alone denotes a ".0" characteristic. This event alone may be enough for pause; when the dependency change is combined with the committer reputation and new dependency project health, a more informed decision can be made. Further inspection is required when adding a new dependency from a low reputation committer especially when the new dependency has poor project health. Applying the committer reputation rank can provide for a better decision on signals.

—Fly in committers— Open source is designed to be collaborative and leverage the spirit of improved changes by the community at large. This introduces a special type of problem where the reputation of the fly-in committer in combination with the type of change being made is important. If the fly-in committer is modifying headers, docs, typos, . . . it's probably okay, if the committer is adding dependencies or modifying critical functionality further review would be required.

—Commit Behavior— Facts from interesting commit events can be extracted based on committer's reputation, an examination of extracted entities from commit messages, and the actual changeset of the source files involved in the commits. A few other examples of commit behavior monitoring:

Commits indicating newly added source files and accompanying extracted topics that reveal added or altered functionality Commits indicating updated source files and accompanying extracted topics that reveal added or altered functionality Extracted insights Peer review discussion thread content Detection of malicious content masquerading as source code. It has been observed that encrypted content is often injected into the software binary that appears to be legitimate source code files.

Determining commit legitimacy based on heuristics of the signed and unsigned commits between releases.

—Dependency Change— Open source software components usually have dependencies to other open source software components. When a new dependency is added to a new release of a software, any existing vulnerability of the newly added dependency may get propagated to the new release. Continuous monitoring of hygienic dependency management based on exploration of added dependency software's hygiene attribute is a necessary feature to infer integrity of a new release of a software. In addition to hygiene of the added dependency, the type of a new dependency may be indicative; for example if the dependency is an HTTP library being added to a component type which conventionally does not require HTTP traffic, the mismatch between the type of new dependency and the component type is suspicious and is indicative of a risk.

—Release publisher and project ownership changes— Monitoring of the publishers who publish a new release of an open source software may be considered as one of the key indicators of anomalous behavior. A publisher change event for a release may or may not be benign. However, the publisher change event's coexistence with other events within the same release sequence increases its susceptibility to malice.

—Typosquatting— Typosquatting of identity coordinates has the potential to be an indicator of a malicious release event given the context of the release event sequence. Typosquatting is the use of a name that mimics a legitimate name but differs at one or more characters which are easily mistyped (due to similar appearance, adjacent keys on a keyboard, slight misspelling, wrong extension, and/or the like, as is conventionally known). An example of typosquatting is flat_map vs. flat-map (hyphen vs. underscore); other examples include the numeral "0" vs. the letter "O"; "3" vs. "E"; "ooo" instead of "oo" (two vs. three of the same letter); .com instead of .co; and many others.

—Source code differential classification— Similar to the dependency change classification, the system can classify the type of change based on source code differences between releases. Knowing that a source code change is a potentially exploitable execution of a system command instead of a benign modification to the business logic increases the susceptibility to malice.

These examples of software release events make up a sequence of events that take place between two (or more) releases. Identifying malicious activities in these events may be technically challenging due to the lack of generality of event sequences across the open source ecosystems. The technical challenge of continuously listening for software release event signals, building sequences of these events and lastly, identifying a few potential malicious events out of a plethora of benign release activities can be addressed by an adaptive system that can automate the modeling of release sequences and identify malicious activities. A corollary of the Generative Adversarial Networks (GAN) technique is convenient to implement an automated continuous system to measure project integrity between releases.

Figure 1C:
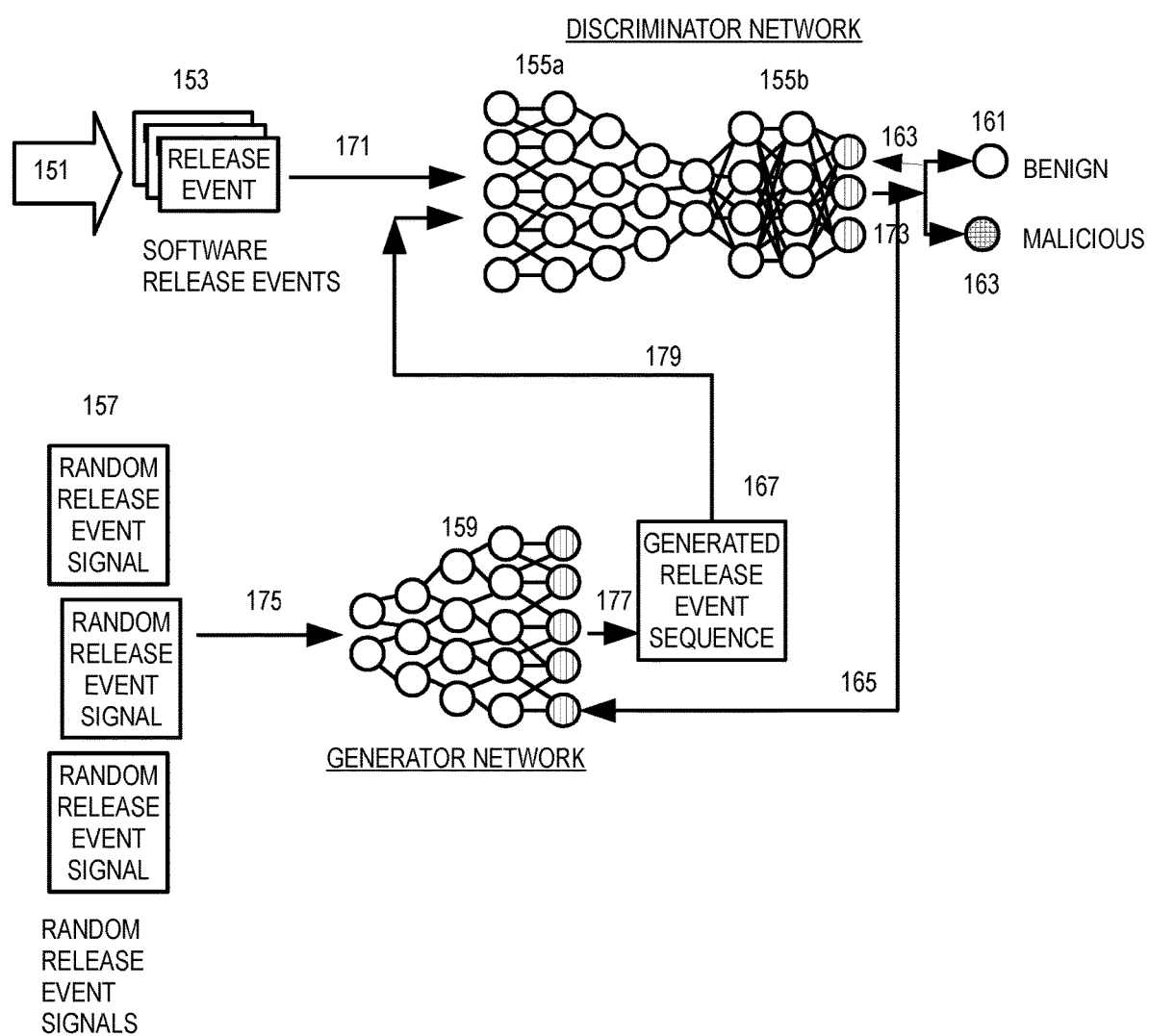
FIG. 1C illustrates a generative adversarial network.

Reference is now made to FIG. 1C, illustrating a representation of a generative adversarial network that supports security of components.

Generative adversarial networks are a set of generative neural network models that consist of a generator network 159 and a discriminator network 155a, 155b. Both the generator and the discriminator are a multi-layered neural network. The generator network 159 attempts to mimic the nature of the benign sequence of release event data from a set of latent random noise and the discriminator network 155a, 155b attempts to identify malicious actors from the generated simulation of event sequences.

A previously-identified set of malicious data may be used again by the generator network 159 to improve simulation data to fool the discriminator network 155a, 155b. The discriminator network 155a, 155b may use improved simulation data to fine-tune its ability to detect malicious events. This approach creates a competition of adaptability between the generator network 159 and the discriminator network 155.

As illustrated in FIG. 1C, a project is released 151, which generates software release events 153 according to known techniques. The software release events are fed into or received 171 by a discriminator network input and analysis 155a, 155b (collectively, the discriminator network 155). The discriminator network input 155a performs fact discovery on the release events 153, as discussed elsewhere herein. The discriminator network 155 detects signals and scores the events 155b, as discussed elsewhere herein. The events are determined 173 by the discriminator network 155 to be either benign 161 or malicious 163. Although FIG. 1C illustrates binary benign/malicious results, non-binary results may be implemented. Random release event signals 157 are randomized and consequently are understood to mimic benign sequence of release event data; the random release event signals 157 are fed into or received 175 by a generator network 159. The generator network generates 177 various combinations of the random release events as a generated release event sequence 167 which represents benign events. The generated release event sequence 167 is fed 179 into the discriminator network for evaluation. The results of the discriminator network 155 are backpropagated 165 to the generator network 169 and to the discriminator network 155. The discriminator network 155 thereby learns to distinguish candidate release event sequences from true release event sequences.

An analogy of the two adaptive neural networks is a situation where an actor (Generator) attempts to fool the critic and the critic (Discriminator) continues to adapt and re-model itself to better identify improved malicious events created by the actor. GAN is an effective solution for measuring release integrity specifically because of its adaptability to the diverse nature of release event sequences of the polyglot landscape of the Open Source ecosystems. It is a technical challenge to generalize the types of release event sequences generated across the ecosystems. An adaptive modeling system such as the Generative Adversarial Network would continue to improve its discriminator and generator models as more release integrity checks are performed.

The opposite goals of the two neural networks 155, 159 force the generator network 159 to improve its ability to generate a realistic simulation of release event sequences and force the discriminator network 155 improve its ability to differentiate between real event sequence data and the simulation data, which can be viewed as unusual. Some of the real events that are of malicious nature are eventually flagged by the discriminator as unusual as if those events originated from the generator network.

In FIG. 2, the system has determined whether any of the POM metadata is inconsistent with the new version of the component. For example, the namespace 205 @notabug is determined to be not popular based on conventional statistics collected in accordance with known techniques regarding how popular a namespace is. An unpopular namespace increases the risk of the associated new version of the component.

Also in FIG. 2, the name 207 of the component "material-ui" is known to be a dependency, and therefor this new version of the component is considered to be a dependency upgrade, which increases the risk. Also, the name 207 of the component "Config.Net.Azure.KeyVault" is known to be credentials associated with cryptographic keys used by apps; a new version of a component which is credentials greatly increases the risk.

Conventionally, a repository can provide a source tag corresponding to a component. A search of the repository to determine whether there is a corresponding source tag 209 for the shows that each of the components Config.Net.Integration.Storage.Net version 5.07, Config.Net.Azure.KeyVault version 4.13.5, and Config.Net version 4.13.5 has no corresponding source tag in the repository. This increases the risk.

The qualifier 211 ("classifier": sources") is determined to not be relevant to the component with which it is associated. This raises a question as to whether the component presents a risk.

A component might not include all of the POM fields. More information in the POM fields of the version of the component should result in a more reliable behavioral analysis of the component.

Temporal Aspect

The inventors observe that these types of indicators are new forms of the easily understood and accepted ".0" (dot zero) fear, discussed above. A ".0" isn't necessarily malicious or bad. Adding a temporal aspect to the adaptive access control may be helpful in some embodiments, such as for critical systems. After a new version of a component is determined to present an unusual risk profile, continued analysis of subsequent behavior observed thereafter of the project released with the new version of the component, the committer that committed the new version of the component, and/or the publisher of the project released with the new version of the component may show that the originally determined risk profile of the new version of the component is not unusual.

Consider the example that a new version of a component is released by a committer who is not previously known. Using the adaptive access control, the risk profile of the new version of the component might be returned to normal after the new committer's subsequent behavior is input to the system and becomes part of the baseline; consequently analysis of subsequent behavior shows that the previously unknown committer presents a risk profile which is consistent with the baseline. This is analogous to the score degradation mentioned above.

Project Health and Behavior

Simple indicators combined with behavior analysis allow for more intelligent reasoning when there are deviations from the norm. Every project has a different sense of normal. One might consider the efficacy of using a project in poor health, but if the poor health remains consistent between releases then it is probably not adding significant new risk to pick up the latest version. Continued poor health of a project does not, on its own, indicate a new risk. By comparison, if the health of the project significantly declines between releases, the project behavior has changed and this would be additional input into the adaptive access control system.

Techniques and tools are conventionally available which check the health of a project and/or repository. For example, a Repository Health Check (RHC) health report for a proxy repository can track, over time, how many components therein have security vulnerabilities, and which components have the most critical vulnerabilities.

Committer Behavior

Historical committer behavior can be used to further assist in more informed reasoning. Software changes between releases involve a sequence of diverse change events and a set of identifiable properties of contributing actors or Software Developers and project maintainers who trigger these events. Latent abnormalities that may impact the integrity of the release may be hidden among the overwhelming majority of their benign peers. In an attempt to surface these abnormalities between software releases, feature identification and classification of all events and committer properties is a step towards building a predictive model to detect malicious patterns.

A committer with no history is riskier than a committer with a long history who has worked on a lot of projects. Historical committer behavior alone does not fully quantify the risk, for example, that the committer's account has been hijacked.

To determine continuance of historical behavior, the available historically collected information may be compared to the same type of current information. It is understood that information such as data fields may newly become available, or information which was not previously collected begins being collected; these may be deemed benign and lightly increase the risk of the component. The occurrence of a new gap in one or more items of collected information, where the information was previously routinely recorded but is no longer available, may be considered to be suspicious and to highly increase the risk of the component.

The system may consider the individual's committer's behavior, e.g., whether the committer has committed from Russia or China before. If the committer's geolocation is novel compared to the committer's historical behavior, the risk is increased.

Publisher Behavior

The system may locate a publisher(s) responsible for a release of a project. The system may collect the historical behavior of a publisher(s) of the project that previously was released with one or more versions of the component. When analyzing publisher behavior, a current behavior which is a continuance of previous historical behavior of the publisher may be considered to be benign and to not increase the risk of the component. Conversely, a current behavior which is not a continuance of previous historical behavior of the publisher may be considered to increase the risk.

To determine continuance of previous historical behavior, the available historically collected information may be compared to the same type of current information. It is understood that information such as data fields may newly become available, or information which was not previously collected begins being collected; these may be deemed benign and lightly increase the risk of the component. Gaps in collected information, where information which was previously collected but is no longer available, may be considered to highly increase the risk of the component.

A new publisher, who has never before published, increases the risk of the component.

A change in one or more characteristics of the publisher(s) who publish a new release of an open source software may increase the risk level. For example, a change in geolocation of the publisher, while not necessarily a problem, may significantly increase the risk when combined with other changes in behavior. As another example, an omission of geolocation of a publisher, which was previously provided, may increase the risk when combined with other changes in behavior. A change in project coordinates (e.g., groupID which groups a set of related artifacts, and/or artifactID which is the project's main identifier) may have significant impact and therefore significantly increase the risk when combined with other changes in behavior.

Heuristic Rule

A set of rules may provide for simple single events that present a risk. For example, a simple "has a new dependency been added" rule is important as it denotes a ".0" characteristic. This event alone may be enough to raise the risk or to alone determine that the new version of the component presents an unusual risk profile. The system can store a history of project dependencies according to known techniques. Scope of dependencies may include, for example, compile, provided, runtime, test, and/or system; dependencies can be declared (so-called optional dependencies); a given dependency may be a predefined specific version or a predefined range of versions; dependencies may be transitive. Dependencies are well managed according to understood techniques in a POM and/or by Maven repository software.

When a heuristic rule is combined with the committer historical behavior and the new dependency project health, enough information exists to automate a blocking action.

Open Source Component Categorization

Sonatype's available open source component categorization can also be used in understanding when anomalous functionality is being added to a project in comparison to previous open source component categorization. Categories may identify the functionality of the component, such as "data management", "RDBMS database" or others, which have been pre-assigned to the version of the component and usually do not change. This functionality may be completely benign, but when combining it with other behavioral analysis, a more informed decisions can be made.

Review of Approach

This approach to monitoring release integrity and its approach to providing information directly to the developer will greatly assist in reducing risk through more informed decisions in component selection as well as rapid response when remediating issues detected after the fact. This materially improves application development efficiencies through the avoidance of rework and streamlining resolution.

The behavioral analysis is of the project, which then gets to the committer, and the publisher. This comes down to the behavior of what is normal for this project, and the people who work on this project, to determine whether something significant changed.

The behavioral analysis might be in response to a publish event of a new version of a component. Alternatively, or in addition, the system may in parallel watch the commit so as to understand commit behavior without trying to perform the behavioral analysis in real time. Ultimately the system is trying to judge the release of the component itself, to look back over the last release and who committed, and prior behaviors. If there are no new committers since the last release and there are no new dependencies in the new release, then the new release might not be risky. If, on the other hand, there is a new committer, one wants to look at the new committer, did they add a new dependency (which would increase risk) and it is a popular committer (which indicates less risk). Popularity of a committer is a known convention. So there are reputation dimensions as to the committer and reputation dimensions as to the component. Many of these recent malicious attacks have been perpetrated by somebody showing up who has no commit history anywhere, who is new to this project and new to the world, and the new version adds a new dependency, and it turns out that that dependency has malicious code.

Not everything that is out of the norm is actually going to be risky or malicious. But, if a combination of behaviors present an unusual risk profile of the new version of the component in comparison to the past behavior of the project, committer, and/or publisher, the new version may be flagged to facilitate delayed consumption, for example; a user might want to wait a few days before using the new version of the component. If the new version actually is malicious, then conventional techniques in common use would eventually flag the new version as malicious so that it should not be used. On the other hand, a new version which seemed risky and was determined to present an unusual risk profile in comparison to the historical behavior analysis might turn out after use to be acceptable to users, so such a new version which is flagged as presenting the unusual risk profile should just be available for use as usual.

The system can monitor active commits, and decide before the release that the release is suspicious. The history is not merely analyzed by being triggered at the point of the release but also the history may be maintained over time.

Many available systems automatically prefer to distribute the most recent version of a component. This means that the latest release, if malicious, then gets distributed to lots of developers. This is why some companies simply do not allow use of any version that is not at least two weeks old. Such a rule is not fool-proof because a malicious releaser could spoof a release date to get around the two week rule. Importantly, delaying everything for two weeks even if there is nothing suspicious is both arbitrarily harming/slowing innovation and simultaneously potentially not a long enough delay for a significant risk to be uncovered. Facilitating delay of a component in response to it being determined to be suspicious based on the historical behavioral analysis, in combination with promptly allowing distribution of the component in response to it being determined to be not suspicious based on the historical behavioral analysis, provides a significant technical advantage in comparison to conventional technology.

It is expected that all of the desired data may not be known. For example, the geographic location may not be known. Some projects may have a lot of rich data and provide excellent historical behavioral analysis. Other projects may not have much data, and consequently a new version of a component may have to exhibit multiple suspicious behaviors before being noticed as presenting an unusual risk profile.

Even if a risky behavior occurs, but is not malicious, it may still be risky. Some developers may want to avoid risky releases. Many developers are trying to avoid this problem by avoiding the .0 releases, which are conventionally known to be buggy.

A ".0" means a new major release, e.g., "2.0" or a new operating system that just came out. The risky components are not all ".0", but notionally it is understood why the .0 may be avoided for a time.

Anomalous functionality may equate to malicious functionality, or the change in a risk posture.

Adaptive Access Control

As discussed above, the system observes past behaviors to try to observe that a new event that just happened in comparison to historical behavior is unusual. Because the system observes behaviors over time, the system adapts to changes in behavior.

Handling Risky Release

In response to determining that a new version of the component presents the unusual risk profile, the system may facilitate delayed consumption of the new version of the component. Such actions to facilitate delay can include blocking access to the new version, quarantining the new version, or flagging use of the new version. The system can notify customers of the risky release.

The system can trigger the handling of the risky release because the release occurred, or the system can trigger the handling of the risky release while watching a commit occur. The system can see the commit at the time a component is added, using conventional techniques.

Prior behavior of an entirely new component may not be accurately assessed.

A repository may have only the binary code, not the source code. The system might have deeper visibility into the source if the system knows the source component. In that case, the system can utilize conventional techniques to notice that there is functionality in the binary which does not exist in the source, indicating that functionality was inserted in the binary (suggesting a malicious component).

Figure 3:
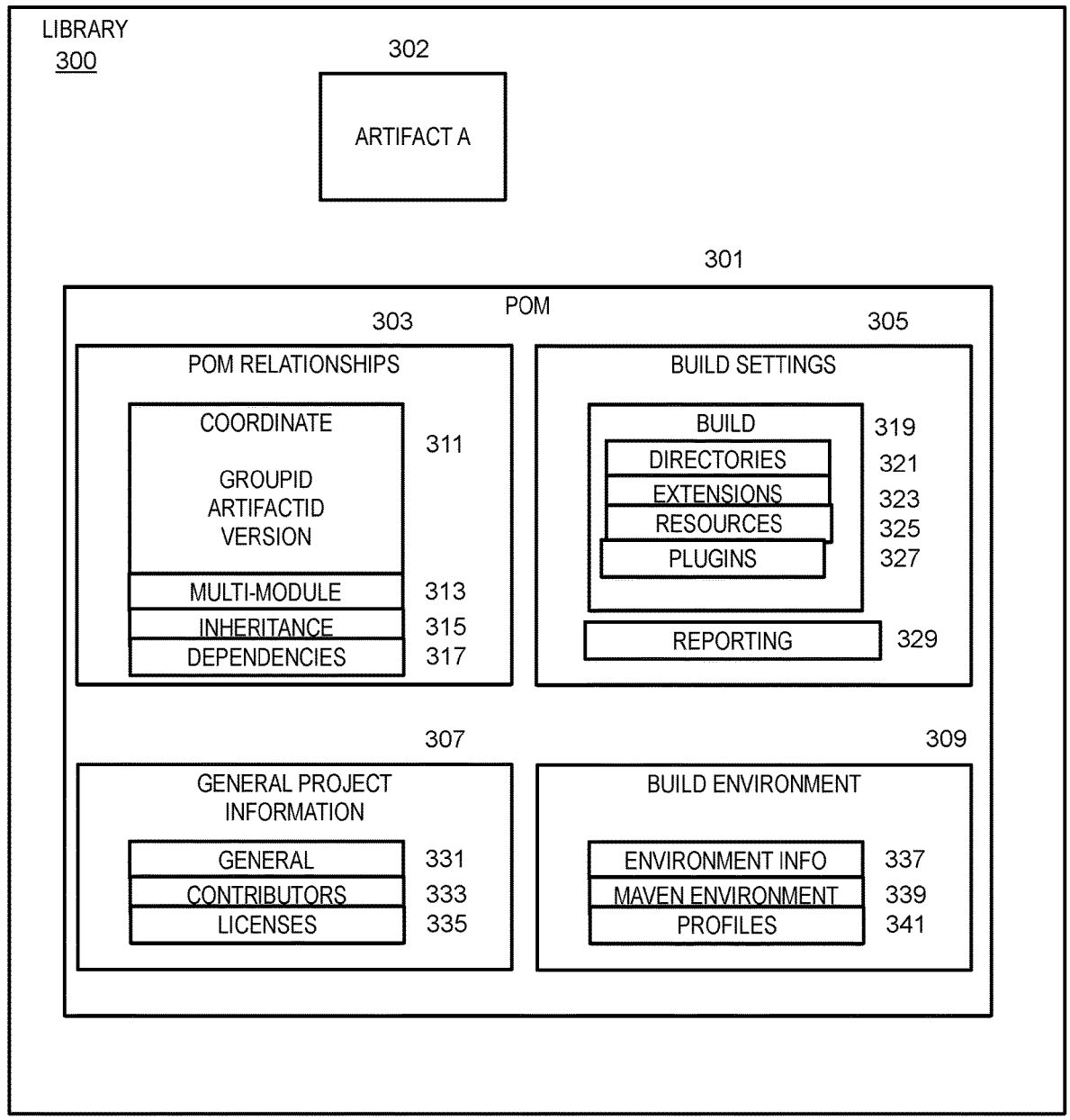
FIG. 3 is a block diagram illustrating a project object model.

Referring now to FIG. 3, a block diagram illustrating a project object model will be discussed and described. As an example, MAVEN project management tool comprises a project object model ("POM"), a set of standards, a project lifecycle, a dependency management system, and logic for executing plugin goals at defined phases in a lifecycle. A "Project Object Model" (POM) 301 is a file that describes configures and customizes an application and is associated with an artifact. In different build tools or project management tools, the POM 301 is a file included a library 300 which includes artifacts (represented by artifact A 302) also having one file with a pre-determined name: a Maven pom.xml file, a GNU Makefile, or an Ant build.xml file. The POM file is typically targeted to Java applications, building JAR artifacts, C# sources, or the like.

The POM 301 can contain different categories of description and configuration: POM relationships 303, build setting 305, general project information 307, and build environment 309. These are discussed in more detail. General project information 307 includes general data 331 (project's name, the URL for a project, the sponsoring organization), a list of developers and contributors 333 and the license (or identifiers of licenses) for a project 335.

The build settings 305 customize the behavior of a default build by specifying location of directories 321, extensions 323, resources 325 and plugins 327. Also, the build settings 305 can specify reporting 329 to be used for the POM 301.

The build environment 309 comprises settings and profiles that can be activated when the software comprising the artifacts 351, 353 is built for use in different environments. For example, during development the built software is deployed to a development server, whereas in production developers the built software is deployed to a production server. This example provides build environment information 337, Maven environment information 339, and profiles 341 to be used in different builds. Techniques for executing a build of software are known.

The POM relationships 303 include POM coordinates 311 that specify a group ID, an artifact ID, and a version number for the POM.

The conventional POM format used for the pom.xml file for component metadata is well standardized and therefore suitable for automated parsing. It is also comprehensive enough to allow for detailed component and dependency information. The POM as used in Maven is discussed in "MAVEN: The Complete Reference Guide", Edition 8 (2010). In a well-written POM, there is a block for "description," "project", "URL", "License", "Issue tracking", "author list" and the like. Known techniques can be used to construct a POM.

A project may include a project log. The project log can perform known functions, such as recording source code check-in, who checked it in, why it was checked-in; recording source code check-out, who checked it out, why it was checked-out; recording update of an artifact, who updated it, from what sponsor, and why it was updated; recording a download of an artifact from the project, who downloaded it, and to where; tracking issues such as bugs and related fixes specifying artifacts which were fixed); and similar. Any and all of the foregoing are considered to be an activity. Typically the log includes a time stamp for each activity. This information may be divided between more than one file, which together can be considered to be a project log. Techniques for maintaining a project log are known in the industry.

A simple example of a POM follows:

```
<project>
    <!-- model version is 4.0.0 for Maven 2.x POMs -->
    <modelVersion>4.0.0</modelVersion>
    <!-- project coordinates, i.e. a group of values which uniquely
    identify this project -->
    <groupId>com.mycompany.app</groupId>
    <artifactId>my-app</artifactId>
    <version>1.0</version>
    <!-- library dependencies -->
    <dependencies>
        <dependency>
            <!-- coordinates of the required library -->
            <groupId>junit</groupId>
            <artifactId>junit</artifactId>
            <version>3.8.1</version>
            <!-- this dependency is only used for running and compiling
            tests -->
            <scope>test</scope>
        </dependency>
    </dependencies>
</project>
```

Figure 4:
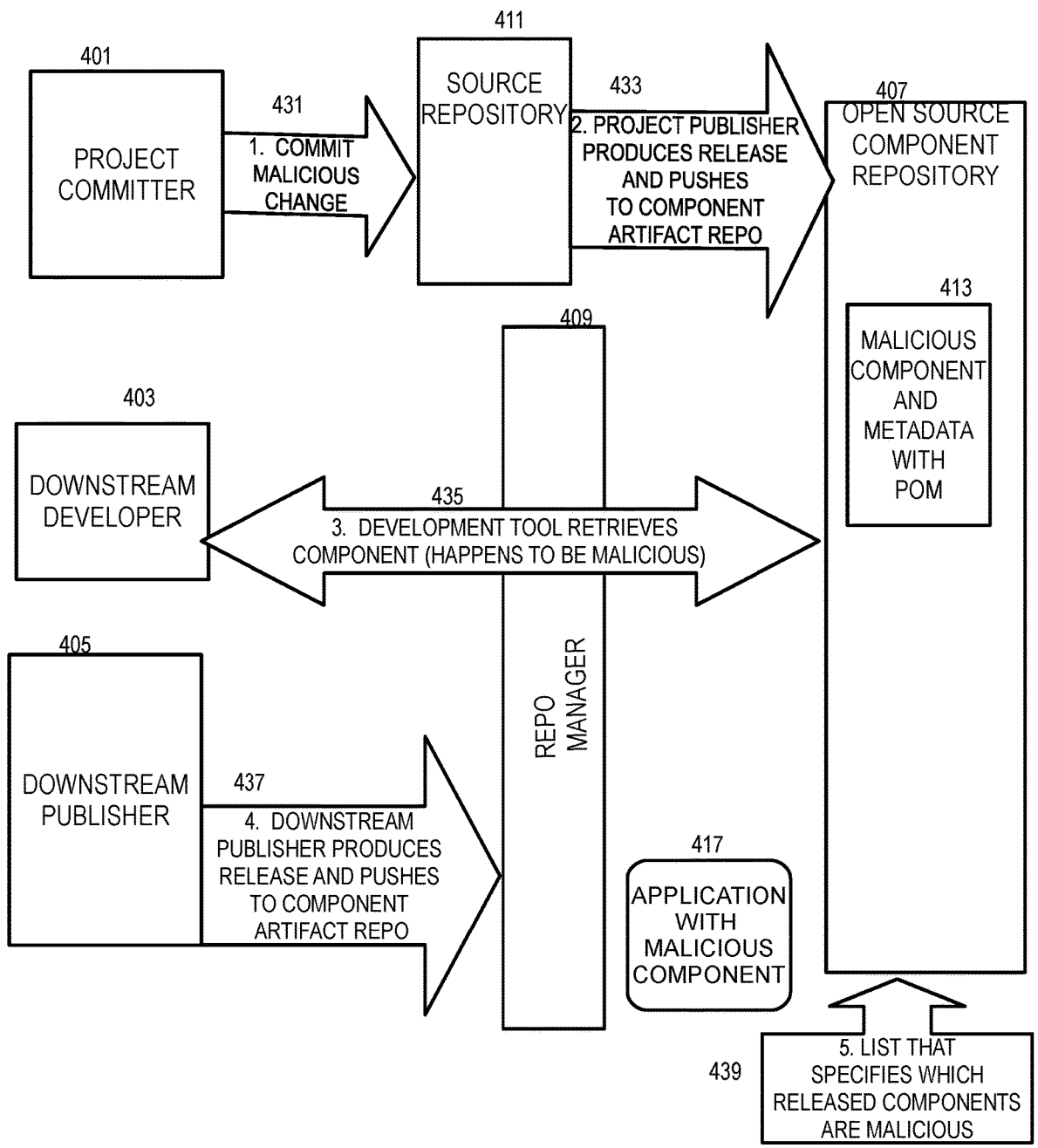
FIG. 4 is a flow diagram illustrating a conventional sequence for components in a simplified typical repository environment.
Figure 5:
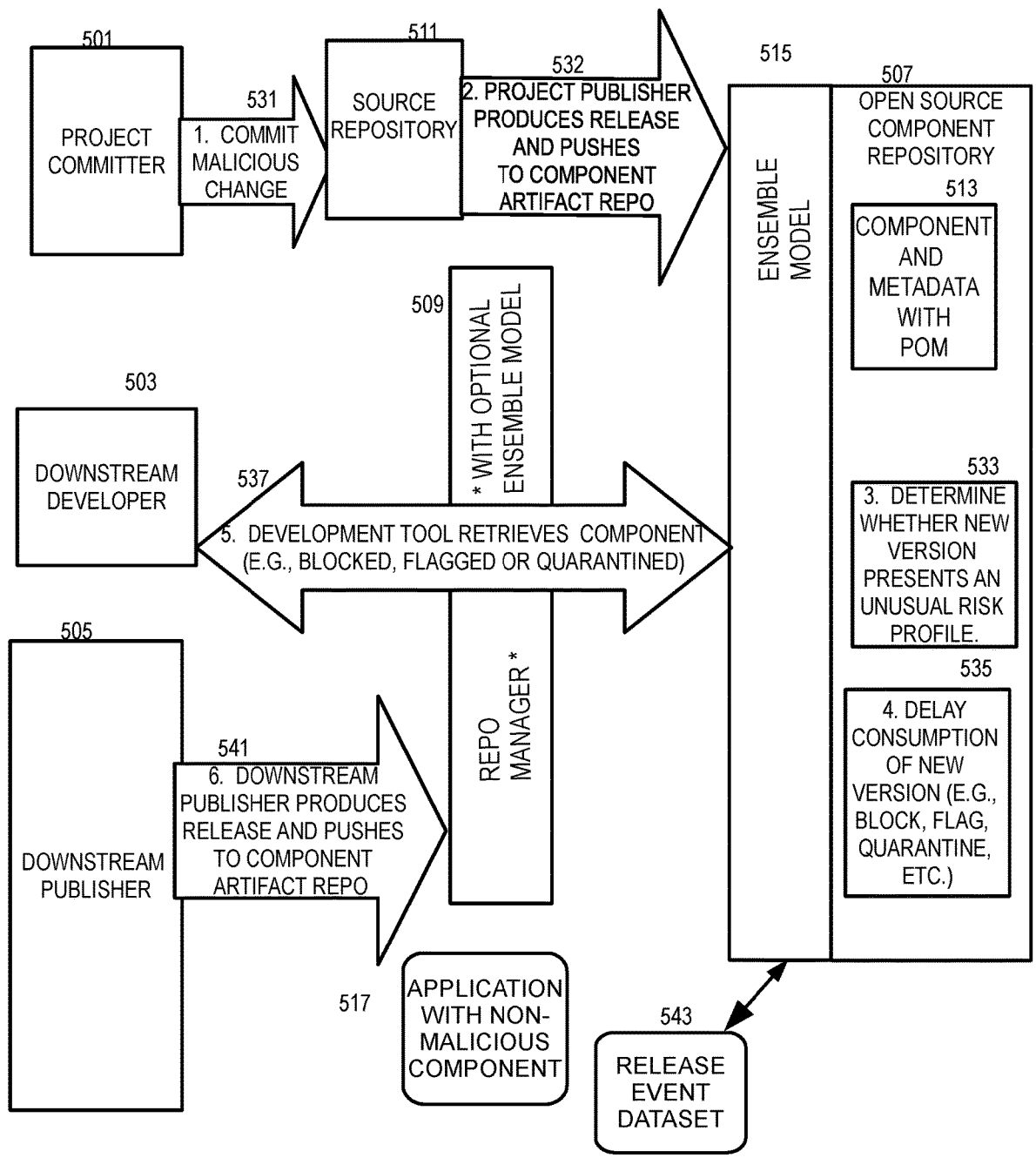
FIG. 5 is a flow diagram illustrating an overall sequence for providing security of components in a simplified repository environment.

FIG. 4 and FIG. 5 are comparative flow diagrams illustrating a difference in operation of conventional automatic distribution of components and thereafter discovering that that a component was changed to be malicious (FIG. 4), vs. the inventive sequence in which the distribution of the suspiciously changed component may be delayed (FIG. 5).

Referring now to FIG. 4, a flow diagram illustrating a conventional sequence for components in a simplified typical repository environment will be discussed. A conventional repository environment supports a project committer 401 (representative of plural different project committers), a downstream developer 403 (representative of plural different downstream developers), and a downstream publisher 405 (representative of plural different downstream publishers). The repository environment conventionally includes a component artifact repository, such as the open source component repository 407, and may include a source repository 411. The repository environment typically includes a repository manager 409 that manages component artifacts in the component artifact repository 407; the repository manager 409 provides a way to publish a component, retrieve a component, perform builds, and the like, as known to one of skill in the art. A component 413 may be stored in the open source component repository 407 and/or at the source repository 411 in accordance with known techniques.

In this typical representative example, the project committer 401 commits a change to the source repository 411; the change is eventually incorporated into a release and pushed to the component artifact repository (represented here by an open source component repository 407, although the open source feature is not necessary). A newest version of the component 413 is typically retrieved from the component artifact repository 407 by the repository manager 409 when the component is requested by the developer 403 or by the project publisher 405. Consequently, the newest version of the component 413 is usually incorporated into a new application.

The following is an example conventional sequence, although one of skill will be familiar with other sequences. In this example, the component is assumed to be malicious. In other examples, the component could have one or more unintentional error or be otherwise suspicious.

1. The project committer 401 commits 431 a change; in this example, the change is a malicious change to a component to include, e.g., a cryptominer. The requested change to the component is stored in a source repository 411.

2. A project publisher produces 433 a release, and pushes the component to the component artifact repository, e.g., the open source component repository 407. The malicious component 413 is then stored in the repository 407. Components stored in the open source component repository are available for developers to use and re-use, according to conventional techniques.

3. Thereafter, the downstream developer 403 uses a development tool 435 and conventionally specifies the name of the component to be retrieved. This step could occur less than a second after the malicious component 413 was stored in the open source component repository 407, or any amount of time after the malicious component 413 appears in the component artifact repository 407. The development tool 435 automatically retrieves the most recent version of the component 413. If the component is popular, it will be frequently retrieved and counterparts may be shared and stored in plural different repositories. Thus, the malicious component 413 may be shared and spread.

4. The downstream publisher 405 wants to produce a release, and produces 437 the release and pushes the component to the component artifact repository 407.

Time passes, perhaps several hours or days. Eventually, a user may notice that the application has a malicious feature, and perhaps a developer notices that the specific version of the component is malicious. According to known techniques for handling malicious software, a list which specifies various malicious components is shared, and the repository 407 (and probably the source repository 411) will remove, notify, quarantine, or otherwise block use of the malicious component 413.

As a result, the malicious component has been widely distributed. Although this has been described in connection with FIG. 4 as a malicious change which is incorporated into a malicious component, in other variations this might be a feature which might be insufficiently tested or error prone.

Referring now to FIG. 5, a flow diagram illustrating an overall sequence for providing security of components in a simplified repository environment will be discussed.

A repository environment as usual supports a project committer 501 (representative of multiple committers) who submits one or more changes intended for incorporation into a project, a downstream developer 503 (representative of plural downstream developers), and a downstream publisher 505 (representative of plural downstream publishers).

The repository environment includes a component artifact repository 507 such as an open source component repository, and may include a source repository 511. The repository environment may include a repository manager 509 that provides a way to publish a component, retrieve a component, perform builds, and the like, as known to one of skill in the art. In the present illustration, the repository manager 509 includes an inventive ensemble model that collects information triggered by release events and constructs models of normal historical behavior of components. A component 513 may be stored in the open source component repository 507 and/or at the source repository 511 in accordance with known techniques.

In this example, the committer 501 commits a change to a component to the repository 507, using a conventional technique. For this example, the assumption again is that this change to the component will cause the component to be malicious. The computer system evaluates whether this version of the component is suspicious; for this example, it is determined to be suspicious. The repository manager 509 might attempt to retrieve a newest version of the component 513 in response to the component being requested by the downstream developer 503 or by the downstream publisher 505. Nevertheless, consumption of the component 513 can be delayed, for example, the newest version of the component 513 (which has a malicious feature due to the change which was committed) is blocked from retrieval, flagged as suspicious, quarantined, or similar. Consequently, consumption of the newest version of the component 513 by the downstream developer 503 and/or the downstream publisher 505 has been delayed; the open source component repository 507 does not provide the newest version of the component, having been determined to be suspicious. The newest release of the component 513, which happens to be malicious, is not incorporated into a new application 517.

The following is a typical sequence, in which the change to the component is assumed to be malicious, which illustrates by comparison a difference to the sequence of FIG. 4.

By way of background, the system will collect release events into a release event dataset 543. The release events may be compiled from conventionally tracked project information, committer information, and component information; and/or additional information regarding release events may be collected. The release events collected into the release event dataset may include one or more of release events, facts discovered events, signals detected events, and/or score calculated events (discussed in connection with at least FIG. 1B, for example). In one or more embodiments, the system expects that the release event dataset 543 is a compilation of reduced information and due to the size of actual release events and related information may omit some or all "release events" that are issued by a repository manager in favor of storing the events of reduced size, namely, facts discovered events, signals detected events, and/or score calculated events.

1. The project committer 501 commits 531 a change; in this example, the change is a malicious change to a component to include, e.g., a cryptominer. The requested change to the component is stored in a source repository 511.

2. A project publisher produces 532 a release, and pushes the component to the component artifact repository, e.g., the open source component repository 507.

3. Upon receipt of the change (or the release with the changed component), the system (here, deployed at the open source component repository 507, including an ensemble model 515) determines 533 whether the new version of the component 513 presents an unusual risk profile based on a historical behavior analysis related to previous versions of the component, as reflected in the release event dataset 543. In this example, the malicious component 513 is determined to present an unusual risk profile.

4. Consumption 535 of the new version is delayed. For example, the malicious component may be stored in the open source component repository 507 and flagged as suspicious, stored in a quarantine unavailable for use, or blocked from retrieval until further appropriate action is taken to unblock the suspicious component.

5. The downstream developer 503 uses a development tool 537 and specifies the name of the component to be retrieved in accordance with known techniques. The development tool 537 automatically retrieves the most recent available version of the component 513. Because the malicious component 513 is blocked, flagged, or quarantined, the version of the component 513 which is determined to be questionable is not retrieved, or if retrieved then the user is warned that the component 513 is suspicious. Since use of the newest version of the component is delayed, the development tool retrieves the most recent non-suspicious version of the component 513.

6. The downstream publisher 505 produces 541 a release and pushes the release to the component artifact repository (represented herein by the open source component repository 507). Note that the most recent non-suspicious version of the component 515 is used, rather then the malicious version. The publisher 405 produces the release, for example, of the application 517, in which the most recent non-suspicious version of the component is included.

Because the malicious version has been determined to present an unusual risk profile, the malicious version has not been distributed. In this implementation, there has been no time during which the malicious version could have been distributed.

Now assume another example in which the new version of the component is determined to be suspicious simply because the committer 501 was new or due to some other .0 event. The same steps occur, and the new version of the component is determined to be suspicious and not distributed. However, as time passes, score degradation as mentioned before occurs, e.g., additional release events and/or events derived therefrom (facts discovered events, signals detected events, and/or score calculated events) are collected into the release event dataset 543, and the behavioral analysis of the additional release events is performed from time-to-time and as a result over time continue to reduce the risk which is determined to be posed by the committer 501 who is no longer new. Based on the behavioral analysis which includes this subsequent information, the new version of the component 513, which was originally determined to be suspicious, is later determined to not present an unusual risk profile.

Consequently, entry of the new version of the component determined to be suspicious into the ecosystem was delayed, until subsequent release events reduce the risk determined by a later behavioral analysis of the new version of the component. The adaptive access control based on these future release events may eventually result in non-delayed provision of the previously suspicious version of the component.

V. Additional Example Implementations

This section will discuss additional concrete examples of implementation, which are well suited to demonstrate various implementation details.

FIG. 6 illustrates a computer system implementation. The procedure of FIG. 7 conveniently may be implemented on the computer system of FIG. 6, or any another apparatus which is appropriately configured and arranged.

Referring now to FIG. 6, a block diagram illustrating relevant portions of a computer system 601 will be discussed and described. A computer system 601 may include one or more controllers 603, a processor 605, a network interface 609 for communication such as with a network 607, a memory 611, a display 615 (optional), and/or a user input device such as a keyboard 617. Alternatively, or in addition to the keyboard 617, a user input device may comprise one or more of various known input devices, such as a pointing device, a keypad, a computer mouse, a touchpad, a touch screen, a trackball, and/or a keyboard. The display 615 is representative of a display that may present information to the user by way of a conventional liquid crystal display (LCD) or other visual display, and/or by way of a conventional audible device (e.g., a speaker) for playing out audible messages. Portions of the computer system 601 are well understood to those of skill in this area and have been omitted to avoid obscuring the discussion.

The processor 605 may comprise one or more microprocessors and/or one or more digital signal processors. The memory 611 may be coupled to the processor 605 and may comprise a read-only memory (ROM), a random-access memory (RAM), a programmable ROM (PROM), and/or an electrically erasable read-only memory (EEPROM). The memory 611 may include multiple memory locations for storing, among other things, an operating system, data and variables 633 for programs executed by the processor 605; such programs can include one or more of the following: to collect 635, over time, release events into datasets of release events; to determine 637 a historical behavioral analysis of a new version of a component based on the dataset of release events over time; to determine 639 whether the new version of the component presents an unusual risk profile based on the historical behavioral analysis; to delay 641 consumption of the new version that presents an unusual risk profile; to determine 643 whether the new version presents the unusual risk as triggered by a publish event; on a periodic basis, to monitor 645 to discovery existence of new versions of components in the software repository and determine its risk; and/or to block, quarantine, flag, etc. 647 use of the new version which is risky; and a database 649 for other information and/or instructions used by the processor 605. The computer programs may be stored, for example, in ROM or PROM and may direct the processor 605 in controlling the operation of the computer system 601. Each of these functions is considered in more detail herein, to the extent that it is not detailed elsewhere in this document.

Responsive to manual signaling from the user input device represented by the keyboard 617, in accordance with instructions stored in memory 611, and/or automatically upon receipt of certain information via the network interface 609, the processor 605 may direct the execution of the stored programs.

The computer system 601 can access one or more software repositories, here represented by software repository

661 on which is stored components, here represented by component 663, in accordance with known techniques. Techniques are known for managing the repository, for committing version of components, for using the repository in a build, and otherwise in connection with software development. Although the software repository is illustrated as accessed over the network interface 609, the repository 661 may be remotely and/or locally accessible from the computer system 601, over a wired and/or wireless connection. The illustrated architectural environment for this runs into the cloud, represented by network 607. Software repositories conventionally have well formatted descriptions of contents. The computer system 601 herein can be adapted to software repositories in the cloud.

The computer system 601 can access a dataset of release events 665, discussed in more detail elsewhere herein. Note that there may be a very large amount of data which is processed in generating in maintaining the dataset of release events 665, and accordingly, distributed processing across multiple processors 605 and/or storage in the cloud may be contemplated by some implementations.

Note that the computer system 601 can be distributed over multiple computers.

Much of the details of the programs have been discussed above, and the following is provided to expand understanding without necessarily repeating what is discussed above, and to possibly explore variations.

The processor 605 may be programmed to collect 635, over time, release events into one or more datasets of release events, along with project behavior, committer behavior, and publisher behavior. In addition, demographics thereof may be collected. Implementation and tracking of release events in general is known to one of skill in this art. As disclosed herein, the release events may be collected into the dataset 665 of release events. Release events may be sourced by, for example, repository release information, software modifications, source code modifications, and/or committer behavior, in addition to other details discussed herein.

The processor 605 may be programmed to determine 637 a historical behavioral analysis of a new version of a component based on the dataset 665 of release events over time. For a new version of a component, the processor can determined, based on the dataset 665 of release events over time, a historical behavioral analysis of (i) the project to which the component belongs, (ii) historical committer behavior of the committer that committed this version of the component, and/or (iii) historical publisher behavior of the publisher that publishes the component. The historical behavioral analysis may weight most heavily the most recent historical behavior, for example in determining that a potential malicious vector was inserted in the current release code base.

The historical behavior of the project can be obtained from the POM (or similar metadata) of the component, which identifies the project. Then release events of the project to which the component belongs can be retrieved from the dataset 665. This information can be aggregated to provide the usual profile of the project.

The historical committer behavior of the committer that committed this version of the component can be obtained by retrieving the namespace (or user name) of the present committer, and based on the committer's namespace (or user name), determining the committer's reputation, historical geographic location(s), usual projects, usual components, and the like. The committer may be determined from a change which was committed that resulted in a new version of the component. This information has been collected in accordance with known techniques. This information can be aggregated to provide a usual profile of the committer.

The historical publisher behavior of the project publisher may be obtained from the POM (or similar metadata) of the component, which identifies the project publisher that produced the release and/or which pushed the particular release of the component to the artifact repository. The release events of the project publisher responsible for the component can be retrieved from the dataset 665. This information can be aggregated to provide the usual profile of the project publisher.

The processor 605 may be programmed to determine 639 whether the new version of the component which arrives at the component artifact repository (represented by the software repository 661) presents an unusual risk profile based on the historical behavioral analysis. The processor may compare the current information and the historical information of a combination of information including, (i) a project released with current and one or more prior versions of the component, and/or (ii) committer behavior of the committer that committed the new version of the component and one or more prior versions of the component, and/or (iii) publisher behavior of the publisher of the project (or plural publishers of the project, if applicable) released with current and one or more prior versions of the component. In this regard, there may a temporal aspect to the behavioral analysis such that historical information and the prior versions which are nearest in time are considered to be more relevant. The processor may consider the project health in determining whether the new version presents an unusual risk profile. A determination that the risk profile is unusual may be strongly influenced by a simple release event meeting a heuristic rule, which is a pre-determined simple single rule. In one or more embodiments, it may be convenient to store the risk profile of each of the versions of the component for later comparison to newly determined risk profiles. Techniques are discussed above for determining whether the new version presents an unusual risk profile based on the historical behavioral analysis, include for example an ensemble model and a discriminator network/generator network.

The processor 605 may be programmed to delay 641 consumption of the new version that presents an unusual risk profile. Different ways may be provided to facilitate delaying consumption and/or delaying consumption of the new version that presents an unusual risk profile. Some of these are discussed in connection with blocking, quarantining, and/or flagging the suspicious component. Furthermore, the procedure may perform adaptive access control by continuing to collect, over time, future release events and updating the historical behavioral analysis as to the new version of the component.

The processor 605 may be programmed to determine 643 whether the new version presents the unusual risk as triggered by a publish event which incorporates the new version of the component. Such a publish event may be a commit, or a release. Techniques are known for publish events. Typically, publish events are noted by the repository manager in accordance with known techniques. The repository manager may take the step of determining whether the new version presents the unusual risk prior to completing the usual publish events (so that the new version of the component is not placed into circulation, and/or is flagged as suspicious).

The processor 605 may be programmed to, on a periodic basis, monitor 645 to discover existence of one or more new versions of components in the software repository and determine their respective risk. This feature may be provided so that components which entered the software repository despite the repository manager and/or ensemble model may be discovered, and then a determination as to whether the risk is unusual may be made. This may be useful for components which existed prior to deployment of the inventive system.

The processor 605 may be programmed to block, quarantine, flag, or the like 647 use of the new version which is determined to be unusually risky. For example, the procedure may flag the new version as suspicious, so that developers that access the new version via a repository manager will be warned that the retrieved version is risky and may choose to avoid the new version. The procedure may quarantine the new version, i.e., store the new version in quarantine storage which is reserved for components that are not available for retrieval by the repository manager until in the future when expressly released from quarantine, for example by a super user or due to adaptive access control as explained herein. The procedure may block the new version from being retrieved by the repository manager. Blocking and/or flagging the new version may result in the repository manager providing the previous version of the component which is not blocked, quarantined, and/or flagged.

The memory 611 also can include other miscellaneous information in a misc. database 649, along with the usual temporary storage and other instructions for other programs not considered herein.

The computer system 601 can accommodate one or more disk drives or removable storage (not illustrated). Typically, these might be one or more of the following: a flash memory, a floppy disk drive, a hard disk drive, a CD ROM, a digital video disk, an optical disk, and/or a removable storage device such as a USB memory stick, variations and evolutions thereof. The number and type of drives and removable storage may vary, typically with different computer configurations. Disk drives may be options, and for space considerations, may be omitted from the computer system used in conjunction with the processes described herein. The computer may also include a CD ROM reader and CD recorder, which can be interconnected by a bus along with other peripheral devices supported by the bus structure and protocol (not illustrated). The bus can serves as the main information highway interconnecting other components of the computer, and can be connected via an interface to the computer. A disk controller (not illustrated) can interface disk drives to the system bus. These may be internal or external. In some embodiments, the computer system 601 can access a virtualized infrastructure commonly referred to as a "cloud" or "cloud storage." The processor 605, memory 611, a disk drive, removable storage medium, and/or cloud storage are referred to as "computer-readable storage media" and provide non-transitory storage of computer programs and data.

It should be understood that FIG. 6 is described in connection with logical groupings of functions or resources. One or more of these logical groupings may be omitted from one or more embodiments. For example, an embodiment of a computer may omit the feature of collecting release events 635 into the datasets, and a different embodiment may be specialized to simply perform the collection of release events 635 into the datasets while omitting the historical behavioral analysis features. Likewise, functions may be grouped differently, combined, or augmented without parting from the scope. Similarly the present description may describe various databases or collections of data and information. One or more groupings of the data or information may be omitted, distributed, combined, or augmented, or provided locally and/or remotely and/or in a virtualized infrastructure commonly referred to as a "cloud" without departing from the scope.

FIG. 7 is a flow chart illustrating a procedure 701 for providing security of components. The procedure can advantageously be implemented on, for example, a processor of a controller, described in connection with FIG. 6 or other apparatus appropriately arranged.

The procedure 701 for providing security will collect 703 release events, over time, into a dataset of release events, such as release events for project(s), events and information for committer(s), and repository information and events. Note that this information may be conventionally collected. This information may be expanded and/or correlated such as in the ensemble model, to support faster behavioral analysis.

The procedure will determine 705 whether the version of a component is a new version. For example, the determination may be triggered by a new version of a component that was pushed to an artifact repository, or the determination may be triggered by a periodic review of a repository which reveals that a new version of a component exists. If there is no new version of a component, the procedure can continue to collect release events over time.

If there is a new version of a component, then the procedure can determine 707, for the new version of a component, based on the dataset of release events collected over time, a historical behavioral analysis of (i) a project released with prior versions of the component, (ii) historical committer behavior of the committer of the new version, and (iii) historical publisher behavior of the publisher of the project which was released with the current and/or prior version(s) of the new component.

Then, the procedure can determine 709 whether the current historical behavioral analysis indicates that the new version of the component presents an unusual risk profile. For example, the procedure may determine whether this is a ".0"-type release for projects to which this component belongs, and/or for the committer of the new version of the component, and/or for the publisher of the project to which the new version belongs. A ".0"-type release for one or more may be sufficient to determine that the new version of the component presents an unusual risk profile. The unusual risk profile may be determined based on a comparison of what is the usual risk profile, as shown by previous historical behavioral analysis which may be determined over versions of the component prior to the current new version.

If the new version of the component is determined 711 to present an unusual risk profile, the procedure may facilitate delaying consumption of the new version. For example, the procedure may flag the new version as suspicious, quarantine the new version, and/or block the new version. Furthermore, the procedure may perform adaptive access control by continuing to collect, over time, future release events and updating the historical behavioral analysis as to the new version of the component.

Accordingly, in a situation that a person puts a malicious component, for example, including crypto-jack feature, into the repository, the system will analyze the component and make a determination that there is something about the component which is suspicious, which can happen as soon as the component hits the repository, and as soon as the data regarding the suspicious component is live. Also, when the developers try to download the suspicious component, the Sonatype® repository Firewall® (or other repository manager) can prevent the download based on the data provided by the system that the component is suspicious, because the component has an outsize risk and the Firewall can be set to not allow the component to go through. So, in some embodiments, there can be literally no point in time where the suspicious artifact could be downloaded.

Furthermore, this is even useful for vulnerabilities that have been around in the system for some period of time. The repository manager can be set to use the data that the component is suspicious, to quarantine the component, to automatically notify the requesting user of the suspicious data, to prevent download of the suspicious component, and/or similar.

The detailed descriptions which appear above may be presented in terms of program procedures executed on a computer or network of computers. These procedural descriptions and representations herein are the means used by those skilled in the art to most effectively convey the substance of their work to others skilled in the art.

FIG. 8 and FIG. 9 provide alternative user interfaces and related information regarding security research and alerts. FIG. 8 provides a list of security alerts, and FIG. 9 provides a drill down to the information resulting in the first row of the security alerts of FIG. 8.

Reference is now made to FIG. 8, a block diagram illustrating an alternative user interface 801 for providing security of components. The user interface 801 includes a sample security research alerts panel. Abnormal behavior detection scores are generated for human curated and/or for automated decisions. In the implementation of FIG. 8, there are three signals, and a simple heuristic engine is provided wherein the abnormality score is calculated based on how many positive signals are present.

The user interface 801 provides a display of available data which may be used for behavioral analysis of a new version of a component.

The example user interface specifies, for a release of a component, the following if available: the format 803, the namespace 805 of the component, the name 807 of the component, the canonical version 809 of the component, any qualifiers 811, and an abnormality score 813. The formal, namespace, component name, canonical version and qualifiers fields 803, 805, 807, 809, 811 are well understood. These fields are analogous to the fields with the same name discussed in connection with FIG. 2 and accordingly the discussion is omitted.

The abnormality score 813 field in FIG. 8 is a simple representative example, based on three signals. Here, the heuristic engine calculates the abnormality based on how many positive signals are present. If two of three positive signals are present, the abnormality is 66.66667; if all positive signals are present, the abnormality is 100. An abnormality score of 100 indicates the highest level of the unusual risk profile, that is, that the new version is risky. In an embodiment, the system may be set with a threshold abnormality score whereby every abnormality score which exceeds the threshold is deemed to have an unusual risk profile. Such unusual risk profile threshold may be predetermined and set to, for example, 100, or 66.66667, or 50, or 25, or 10, or other number, depending on the level of risk the administrator predetermines is acceptable. In the example of FIG. 8, the abnormality threshold is set to 66.66667; the example user interface 801 displays alerts which meet or exceed the abnormality threshold.

Reference is now made to FIG. 9, an example drill down that represents how detection was determined and provides additional facts to expedite further research. The basis for the detection determination includes the "Coordinates", "Summary", "Rules," and "Signals". In the example of FIG. 9, the "Coordinates" include the component format, namespace, name, version, and any qualifiers (in this example, there are no qualifiers). The "Summary" is the abnormality score. The "Rules" are "simple" and include "triggered", "minAbnormality" of 0, and "maxAbnormality" of 66.66667. The "Signals" which are observed include "npm-registry" signals of "dependencies changed", "developer dependencies changed", and "publisher changed."The "Release" includes a snapshot of npm-registry metadata of the component that is to be released. The "Facts" include npm-registry information for the latest dependencies, latest developer dependencies, latest publisher, previous version, previous dependencies, previous developer dependencies, and previous publisher. In this example, the system compares and notes a difference in the previous and latest dependencies, and a difference in the previous and latest developer dependencies. The system generates the three npm-registry signals, which indicate whether or not there is a change in the dependencies, developer dependencies, and publisher. The signals which are generated are combined by the Rules into an abnormality score of 66.66667, which meets the maximum abnormality threshold as shown by the Rules. In this way, a user can easily determine why the component is determined to have an abnormality.

VI. Glossary

Terms as used herein are intended to be interpreted first, as understood to one of skill in the art at a first level, of software repositories; and if not interpretable at the first level, than at a second level as understood by one skilled in the science of tools that support and manage software development; and if not interpretable at the first level and second level, then at a third level as understood to one of skill in the art of computer science; and then if not interpretable according to the first, second and third levels, according to a general dictionary.

The claims may use the following terms (with or without capitalization), which are defined to have the following meanings for the purpose of the claims herein. Other definitions may be specified in this document.

The designation "package" as used herein is defined as a container (which is a file or a folder) that bundles together components intended for use by a particular application, and/or to assist in installing and/or de-installing, and/or running the particular application, and/or which are used by the particular software application and/or which are used in a build of the particular software application; the package also includes manifest data which identify the package and which uniquely identify the constituent files that enable the package to function. By way of explanation and not definition, the package may contain, as a non-limiting example, one or more of the following: content needed to reference an external library, source code, binaries, executable files, classes, interfaces, scripts, documentation, components used during installation, components used for running the particular application itself, other packages, components and/or related items. The manifest metadata in a package generally indicates the following or similar: the software's name, description of its purpose, version number, vendor, integrity information such as a checksum, and an enumerated list of dependencies on other components necessary for the software to run properly. Package managers which consume packages include, by way of example, NuGet, Node Package Manager, PyPi, RubyGems, PHP Composer, Android, Alpine Linux, Windows 8 and later, Windows Phone, Debian and its derivatives, Gentoo Linux, ORB Launcher, Pardus, OSDX, iOX, PlaysStation 3, Solaris, SunOS, UNIX System V, Symbian, BeOS, Apple Netwon, Puppy Linux, Red Hat Enterprise Linux, Fedora and its derivatives, Ubuntu, Slitaz, Tiny Core Linux, Ach Linux's Pacman, Slackware, and evolutions and extensions thereof. Formats of packages have internal structures and file name extensions consistent with one or more package formats defined by, for example, APK, APPX, APPXBundle, Deb, ebuild, ORB, PISI, PKG, PUP, PET, RPM, SNAP, TAZPKG, TCZ, Tar archives, and evolutions and extensions thereof.

The term "byte code" as used herein is defined to mean an intermediate operational code which was generated by translating an input programming language, and then the byte code can be interpreted at the time the byte code is executed by the virtual machine which has its own instruction set independent of the native machine code for the hardware on which the virtual machine executes. Examples of computer languages which use "byte code" include, without limitation, Java, .NET, Scala, jython, groovy, and Pascal The term "component" used herein is defined to be a specific version (which may be a canonical version) of pre-existing software, or a reusable pre-existing self-contained software code building block which is not a complete stand-alone finished product ready for use, which is source code, software or run-time executable code; a component can comprise one or more nested components within the component itself; a component can be the subject of a risk such as a license or a target of a security vulnerability.

By way of explanation and not as a definition, a component which is part of a stand-alone product can be understood to be a self-contained bit of code which a developer does not wish to write himself/herself as part of the stand-alone product, and so the developer uses a previously existing component for which the functionality likely was previously vetted as a part of another stand-alone product. As a non-limiting example of components which are nested, a Java web application packaged as a WAR component might contain various JAR components and JavaScript libraries, each of which is a component themselves.

The term "computer system" or "computer" used herein denotes a device sometimes referred to as a computer, laptop, personal computer, tablet computer, handheld computer, smart phone, personal digital assistant, notebook computer, personal assignment pad, server, client, mainframe computer, minicomputer, or evolutions and equivalents thereof.

"Open source" software is defined herein to be source code that allows distribution as source code as well as compiled form and/or binary form, with a well-publicized and indexed means of obtaining the source, optionally with a license that allows modifications and derived works.

The term "repository" or "software repository" used herein are defined to mean an electronic storage system that stores components (sometimes referred to as an "artifact") and dependencies for later retrieval, to which artifacts are published in accordance with procedures which are well known to those in the field, so that artifacts made by one software developer are published to be available for further use by other software developers, to be incorporated as building blocks to build software products which can be executed; a repository can include a computer server by which the stored electronic copies of artifacts are made available for use by software developers to be incorporated as building blocks to build software products which can be executed; the repository typically has a unique identifier that indicates the software developer (an individual or a group) that contributed the artifact.

By way of explanation and not definition, a repository can be remote or local; some embodiments of a repository might be stored in a virtualized infrastructure commonly referred to as a "cloud." Examples of conventional software repositories include, by way of example but without limitation: the Central Repository (also known as Maven Central), the NuGet Gallery, RubyGems.org, npmjs.org, and many others. Repositories tend to rely on pre-defined formats and tools, for example, the Maven repository format, REST API interactions, different directory structures with format specific files for metadata, and the like. Software repositories are accessed by tools, including by way of example but without limitation: build tools such as Maven, Gradle, rake, grunt, and others; package managers such as npm, nugget, gem, and others; Integrated Development Environments such as Eclipse, IntelliJ, and many others.

The term "software build" used herein specifically is defined to mean a process as pre-defined in an executable build program of converting a plurality of components (some or all of which may be obtained from a repository) and combining the results into an executable stand-alone computer program or a software component for use in a further software build, including at least compiling components and linking compiled components and possibly binary components (which can be from the repository), in a predetermined order as defined in the build program.

The term "compiler" is used herein specifically to mean a computer program(s) that transforms source code written in a programming language into a target language that is readable by a computer, often in the form of binary code or bytecode, so as to create an executable program.

The phrase "automatically without manual intervention," when used in a claim, is defined to mean that the particular step occurs after the step is initiated until limitations recited in the step are finished without requiring a user to provide input to a processor.

VII. Implementation and Technical Notes

The above discussion has assumed that the reader has a sufficient technical background for appreciating the points made. This section provides some supplementary implementation and/or technical notes which discuss some technical information that may be relevant.

The instant disclosure is provided to further explain in an enabling fashion the best modes of performing one or more embodiments. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as a digital signal processor and software therefore, and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring principles and concepts, further discussion of such software and ICs, if any, will be limited to the essentials with respect to the principles and concepts used by the exemplary embodiments.

The various embodiments which demonstrate a method and/or system for security of components have been discussed in detail above. It should be further noted that the above-described processes can be stored as instructions in computer-readable storage medium. When the instructions are executed by a computer, for example after being loaded from a computer-readable storage medium, the process(es) are performed.

Further, an embodiment has been discussed in certain examples as if it is used by a single developer or administrator at a single site. An embodiment may be used by numerous developers, administrators and/or related users, if preferred, at one or more sites.

A procedure is generally conceived to be a self-consistent sequence of steps leading to a desired result. These steps are those requiring physical manipulations of physical quantities. Usually, though not necessarily, these quantities take the form of electrical or magnetic signals capable of being stored on non-transitory computer-readable media, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms such as adding, determining, or comparing, which are commonly associated with mental operations performed by a human operator. While the discussion herein may contemplate the use of an operator, a human operator is not necessary, or desirable in most cases, to perform the actual functions described herein; the operations are machine operations.

Various computers or computer systems may be programmed with programs written in accordance with the teachings herein, or it may prove more convenient to construct a more specialized apparatus to perform the required method steps. The required structure for a variety of these machines will be apparent from the description given herein.

A computer-readable storage medium is tangible and non-transitory; a computer-readable storage medium can be any of the memory or storage devices, such as those examples described above, or other removable or fixed storage medium, provided such computer-readable storage medium is tangible and non-transitory.

Furthermore, any communication network implicated in an embodiment can include, by way of example but not limitation, data and/or packet communications networks, which can provide wireless communications capability and/or utilize wireline connections such as cable and/or a connector, or similar. Any appropriate communication protocol may be used.

The computer and/or system embodied in connection herewith may (or may not) rely on the integration of various elements including, as appropriate and/or if desired, by way of example but not limitation, hardware and software servers, applications software, database engines, server area networks, conventional firewall and SSL security, production back-up systems, and/or applications interface software. An embodiment may be, by way of example but not by way of limitation, network-based and may (or may not) utilize a network such as the Internet or other network as an exemplary interface with the user for any information delivery.

One or more displays for the system may be developed in connection with, by way of example but not limitation, HTML display format, using XML. Although HTML, and XML, may be a preferred display format, it is possible to utilize alternative display formats for interacting with a user and obtaining user instructions.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A computer system for security of components, comprising:
    at least one processor; and
    a memory storing instructions that, when executed by the at least one processor, configure the at least one processor to:
        for a new version of a component, determine, based on a dataset of release events over time including event data collected over time indicating projects from which components are built, produced or released, committers that committed to the projects, and repositories into which components are stored, a historical behavioral analysis which is a baseline behavior model of (i) a project, among the projects, that was released with prior versions of the component, and/or (ii) historical committer behavior of a committer, among the committers, that committed the new version of the component, and/or (iii) historical behavior of a publisher of the project, among the projects;
        determine whether behavior leading to a current release of the new version of the component presents an unusual risk profile by differing from the baseline behavior model of the historical behavioral analysis of the project, the historical committer behavior, and/or the historical behavior of the publisher; and
        facilitate delayed consumption of the new version of the component in response to determining that the new version of the component presents the unusual risk profile.

2. The computer system of claim 1, wherein the processor is further configured to determine a profile of the new version of the component.

3. The computer system of claim 1, wherein the processor is further configured to determine whether the new version presents the unusual risk in response to a publish event incorporating the new version of the component.

4. The computer system of claim 3, wherein the publish event is a commit, or a release.

5. The computer system of claim 1, wherein the processor is further configured to, on a periodic basis, monitor to discover existence of the new version in a software repository, and determine whether the new version that exists presents the unusual risk responsive to discovering the existence of the new version.

6. The computer system of claim 1, wherein the processor is further configured to perform adaptive access control which facilitates delayed consumption of the new version which is determined to present the unusual risk profile.

7. The computer system of claim 1, wherein the processor is further configured to, in response to determining that the new version of the component presents the unusual risk profile, block, quarantine, or flag use of the new version.

8. The computer system of claim 1, wherein the processor is further configured to determine whether the new version of the component presents the unusual risk based on a classification change of the new version of the component, wherein the classification change includes one or both of a source code differential classification and a dependency change classification.

9. A computer-implemented method for providing security of components, comprising:
determining, by a processor, for a new version of a component, based on a dataset of release events over time including event data collected over time indicating projects from which components are built, produced or released, committers that committed to the projects, and repositories into which components are stored, a historical behavioral analysis which is a baseline behavior model of (i) a project, among the projects, that was released with prior versions of the component, and/or (ii) historical committer behavior of a committer, among the committers, that committed the new version of the component, and/or (iii) historical behavior of a publisher of the project, among the projects;
determining, by the processor, whether behavior leading to a current release of the new version of the component presents an unusual risk profile by differing from the baseline behavior model of the historical behavioral analysis of the project, the historical committer behavior, and/or the historical behavior of the publisher; and
facilitating, by the processor, delayed consumption of the new version of the component in response to determining that the new version of the component presents the unusual risk profile.

10. The method of claim 9, further comprising determining, by the processor, a profile of the new version of the component.

11. The method of claim 9, wherein the determining, by the processor, whether the new version presents the unusual risk is performed in response to a publish event incorporating the new version of the component.

12. The method of claim 11, wherein the publish event that triggers the determining of the unusual risk is a commit, or a release.

13. The method of claim 9, further comprising monitoring, by the processor, on a periodic basis, to discover existence of the new version in a software repository, and determining whether the new version that exists presents the unusual risk responsive to discovering the existence of the new version.

14. The method of claim 9, further comprising performing, by the processor, adaptive access control which facilitates delayed consumption of the new version which is determined to present the unusual risk profile.

15. The method of claim 9, further comprising, by the processor, in response to determining that the new version of the component presents the unusual risk profile, blocking, quarantining, or flagging use of the new version.

16. The method of claim 9, further comprising, by the processor, determining whether the new version of the component presents the unusual risk based on a classification change of the new version of the component, wherein the classification change includes one or both of a source code differential classification and a dependency change classification.

17. A non-transitory computer-readable medium comprising instructions for execution by a computer, the instructions including a computer-implemented method for providing security of components, the instructions for implementing:
determining, for a new version of a component, based on a dataset of release events over time including event data collected over time indicating projects from which components are built, produced or released, committers that committed to the projects, and repositories into which components are stored, a historical behavioral analysis which is a baseline behavior model of (i) a project, among the projects, that was released with prior versions of the component, and/or (ii) historical committer behavior of a committer, among the committers, that committed the new version of the component, and/or (iii) historical behavior of a publisher of the project, among the projects;
determining whether behavior leading to a current release of the new version of the component presents an unusual risk profile by differing from the baseline behavior model of the historical behavioral analysis of the project, the historical committer behavior, and/or the historical behavior of the publisher; and
facilitating delayed consumption of the new version of the component in response to determining that the new version of the component presents the unusual risk profile.

18. The non-transitory computer-readable medium of claim 17, further comprising determining a profile of the new version of the component.

19. The non-transitory computer-readable medium of claim 17, wherein the determining whether the new version presents the unusual risk is performed in response to a publish event incorporating the new version of the component.

20. The non-transitory computer-readable medium of claim 19, wherein the publish event that triggers the determining of the unusual risk is a commit, or a release.

21. The non-transitory computer-readable medium of claim 17, further comprising monitoring, on a periodic basis, to discover existence of the new version in a software repository, and determining whether the new version that exists presents the unusual risk responsive to discovering the existence of the new version.

22. The non-transitory computer-readable medium of claim 17, further comprising performing adaptive access control which facilitates delayed consumption of the new version which is determined to present the unusual risk profile.

23. The non-transitory computer-readable medium of claim 17, further comprising determining whether the new version of the component presents the unusual risk based on a classification change of the new version of the component, wherein the classification change includes one or both of a source code differential classification and a dependency change classification.

* * * * *